(12) United States Patent
Hunot et al.

(10) Patent No.: US 6,782,802 B2
(45) Date of Patent: Aug. 31, 2004

(54) ROLLER GRILL ASSEMBLY FOR COOKING HUMAN FOOD

(75) Inventors: Thomas Hunot, Bridgeton, MO (US); Michael Lee Huegerich, St. Louis, MO (US); Frank P. Ricchio, Ballwin, MO (US)

(73) Assignee: Star Manufacturing International, St. Louis, MO (US)

( * ) Notice: Subject to any disclaimer, the term of this patent is extended or adjusted under 35 U.S.C. 154(b) by 229 days.

(21) Appl. No.: 10/080,211

(22) Filed: Feb. 21, 2002

(65) Prior Publication Data

US 2002/0148359 A1 Oct. 17, 2002

Related U.S. Application Data

(63) Continuation of application No. 09/414,785, filed on Oct. 8, 1999, now Pat. No. 6,393,971.
(60) Provisional application No. 60/103,645, filed on Oct. 9, 1998.

(51) Int. Cl.$^7$ ................................................ A47J 37/06
(52) U.S. Cl. ............................ 99/341; 99/393; 99/395; 99/427; 99/443 R; 99/441; 99/444; 219/214; 219/469; 219/470; 219/471
(58) Field of Search ........................ 99/341, 441, 427, 99/443 R, 444, 393, 395, 357, 423; 219/214, 469–471; 126/190, 191, 194

(56) References Cited

U.S. PATENT DOCUMENTS

| | | | |
|---|---|---|---|
| 2,185,979 A | * | 1/1940 | Joseph ........................ 99/423 |
| 2,253,434 A | | 8/1941 | Kernick ............................ 53/5 |
| 2,604,842 A | | 7/1952 | Dolce ........................... 99/423 |
| 3,472,156 A | | 10/1969 | Bardeau et al. ............... 99/423 |
| 3,756,219 A | | 9/1973 | Snyder et al. .............. 126/191 |
| 3,981,233 A | | 9/1976 | Nugarus ....................... 99/422 |
| 4,817,585 A | | 4/1989 | Craver ....................... 126/200 |
| 5,111,956 A | * | 5/1992 | Jow ........................... 220/811 |
| 5,458,051 A | | 10/1995 | Alden et al. .................. 99/349 |
| 5,549,040 A | | 8/1996 | Naramura .................... 99/349 |
| 5,722,315 A | | 3/1998 | Naramura .................... 99/349 |
| 6,166,353 A | | 12/2000 | Senneville et al. ......... 219/385 |
| 6,393,971 B1 | * | 5/2002 | Hunot et al. .................. 99/341 |
| 6,659,574 B2 | * | 12/2003 | Huegerich .................. 312/137 |

OTHER PUBLICATIONS

APW/Wyott—Hot Rod Rolling Grills Product Brochre; Aug., 1995.

(List continued on next page.)

Primary Examiner—Drew Becker
(74) Attorney, Agent, or Firm—Polster, Lieder, Woodruff & Lucchesi, L.C.

(57) ABSTRACT

A roller grill assembly for cooking human food has a plurality of horizontally aligned roller tubes which can be arranged to extend at an angle of about 3° to 5° are rotatably mounted to a housing frame. A sealing assembly comprises a bearing member and an annular sealing member. A drive chain engages an idler sprocket to rotate the tubes. The housing has a cavity that receives a sliding compartment assembly that has a frame comprising track members and a cross strut shaped to support a pan for holding food. The tubes have heating elements with compact spiraled configuration at the ends. A cover is pivotally mounted by a biased pin or two legged spring to cover a control panel.

49 Claims, 12 Drawing Sheets

OTHER PUBLICATIONS

Page from a trade magazine (publication date unknown, but product existed prior to Oct. 9, 1997), showing APW/Wyott Roller Grill.
Connolly Roll–A–Grill (publication date unknown, but products existed prior to Oct. 9, 1997).
Gold Medal Roller Grill Assemblies (publication date unknown, but products existed prior to Oct. 9, 1997).
Roundup Hot Dog Corrals (publication date unknown, products existed prior to Oct. 9, 1997).
Trade magazine advertisements showing Gold Medal Products Roller Grill, Berks Packing Company's Roller Grill, and other products (publication date unknown, products existed prior to Oct. 9, 1997).
Watlow Catalog pages (products such as shown existed prior to Oct. 9, 1997).
Fluoroplastics, published in *Modern Plastics Encyclopedia*, 1981–1982, discussing polytetrafluoroethylene (PTFE).
Website Information of Whitford showing prior art information concerning PTFE (polytetrafluoroethylene), date N.A.
Attached Photographs Numbered 1 through 22, date N.A.

* cited by examiner

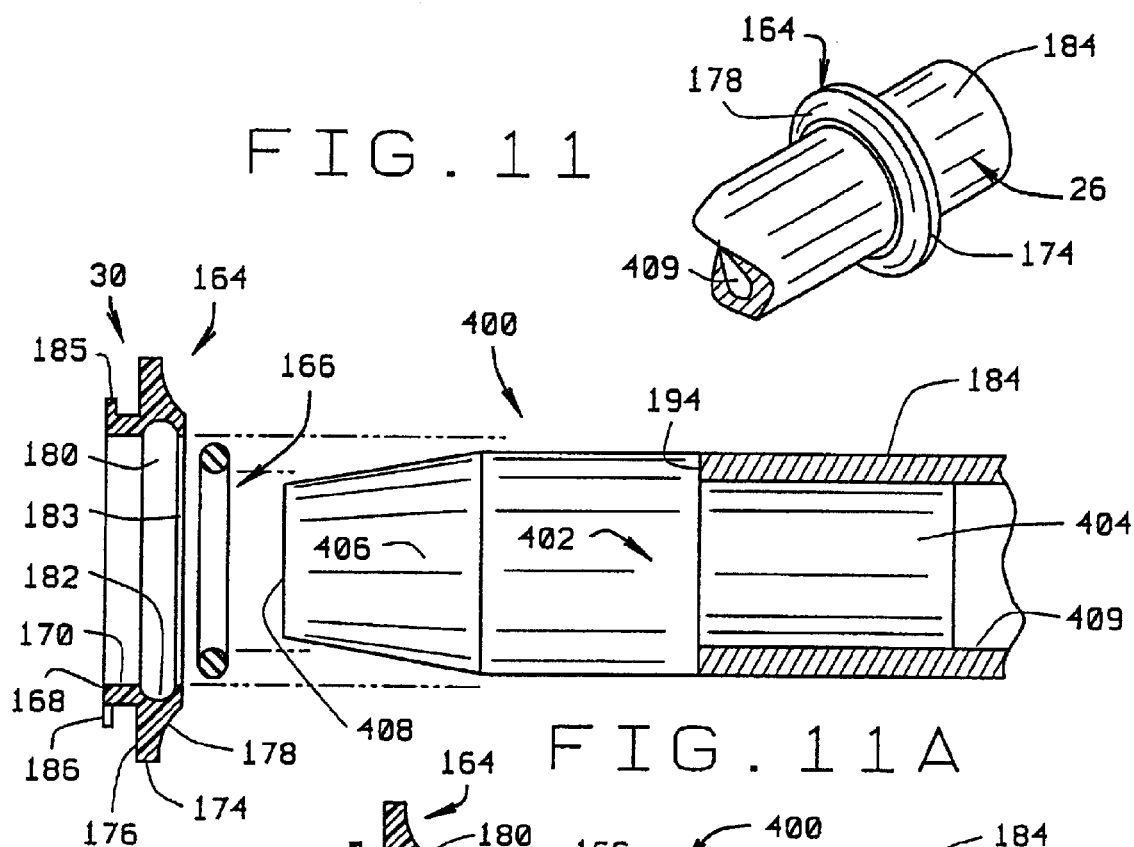
FIG. 11
FIG. 11A
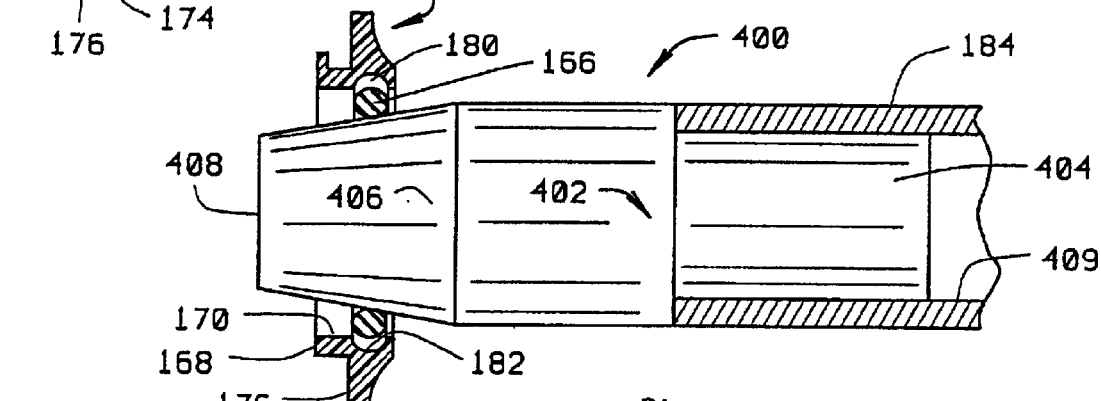
FIG. 11B
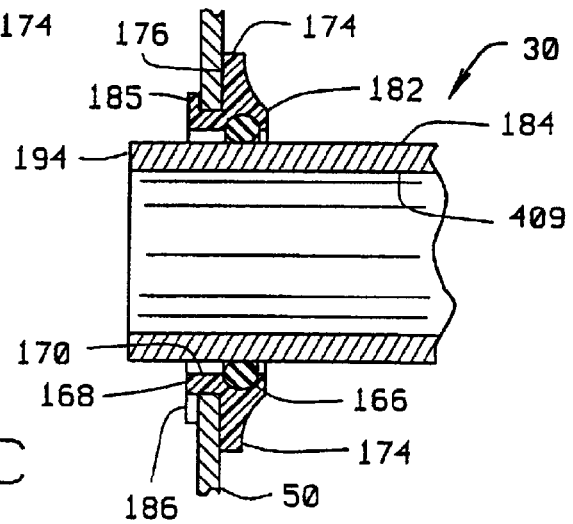
FIG. 11C

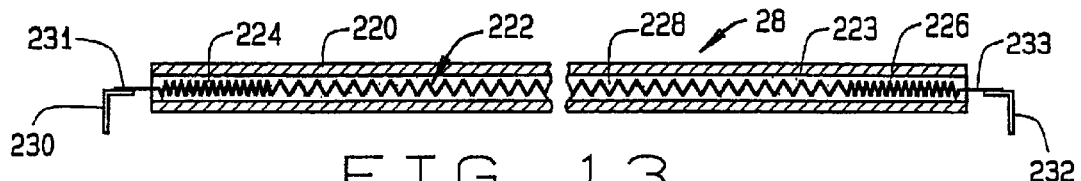
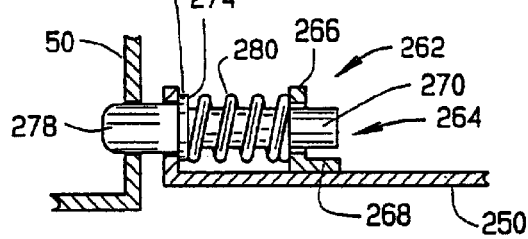
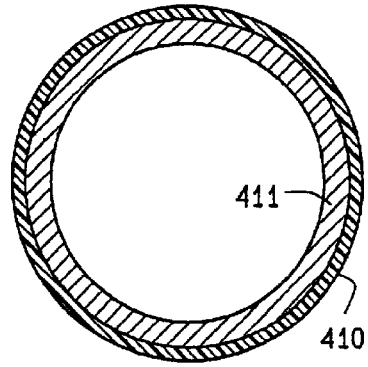
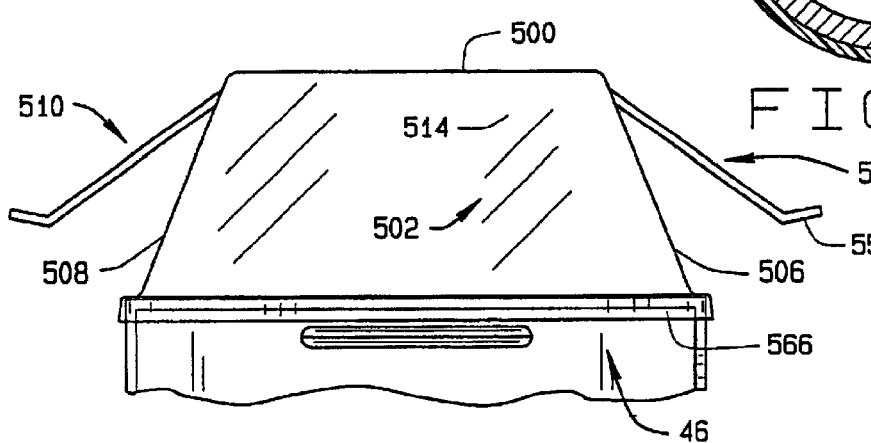
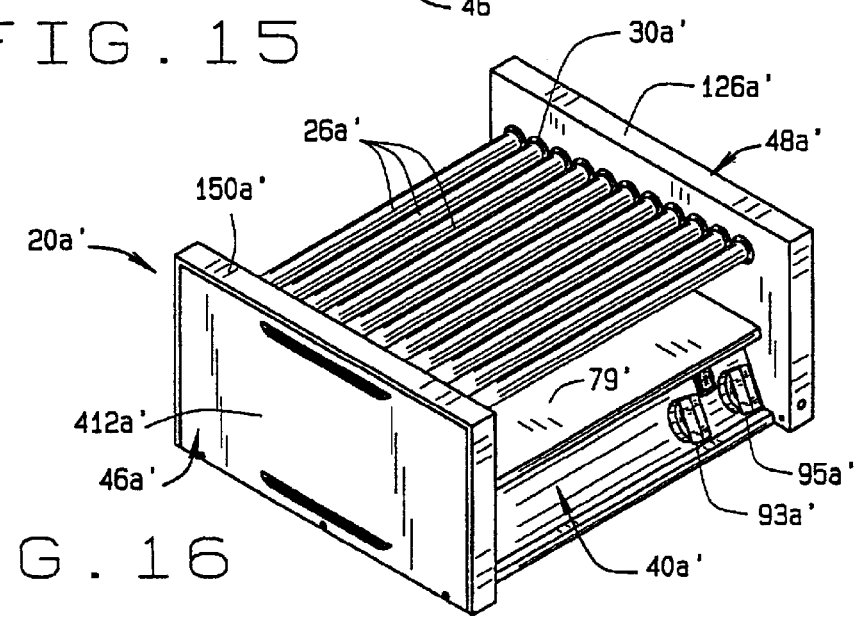

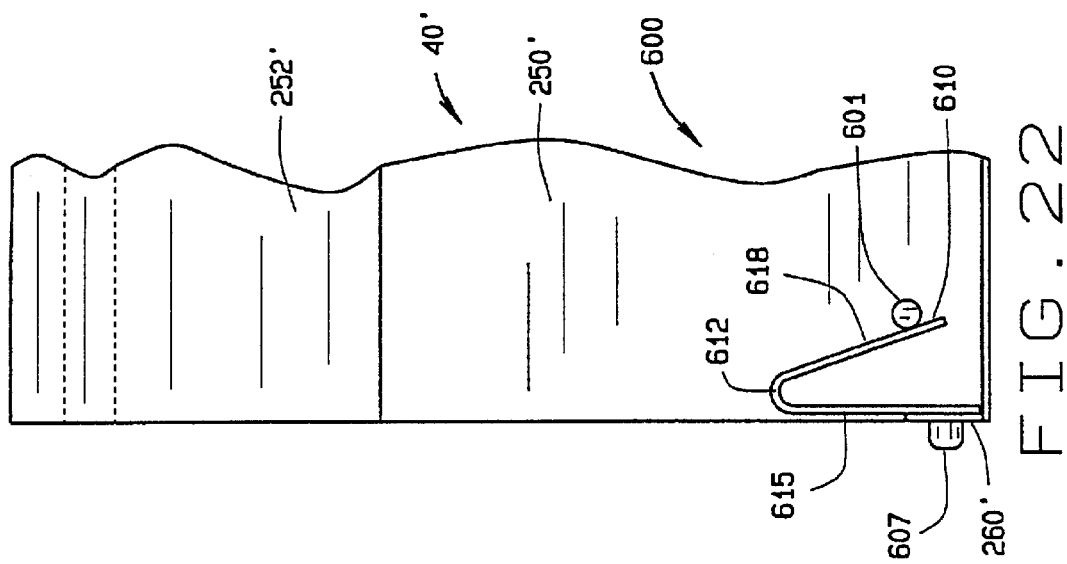
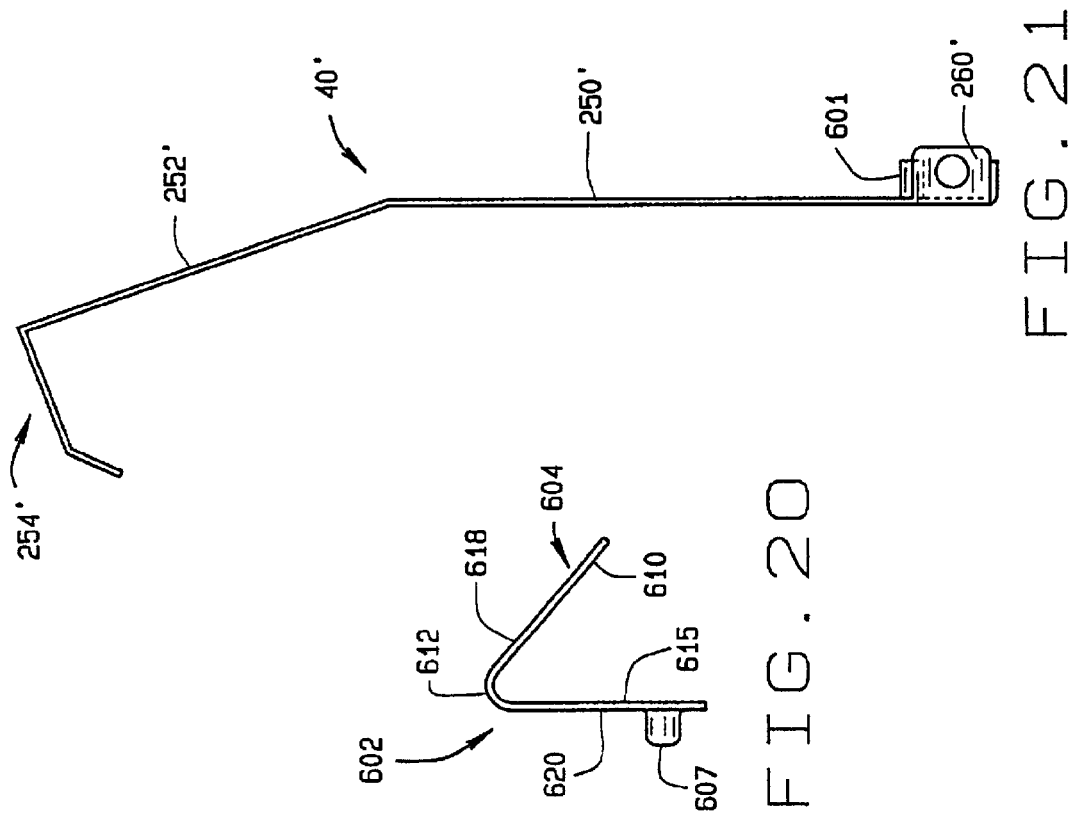

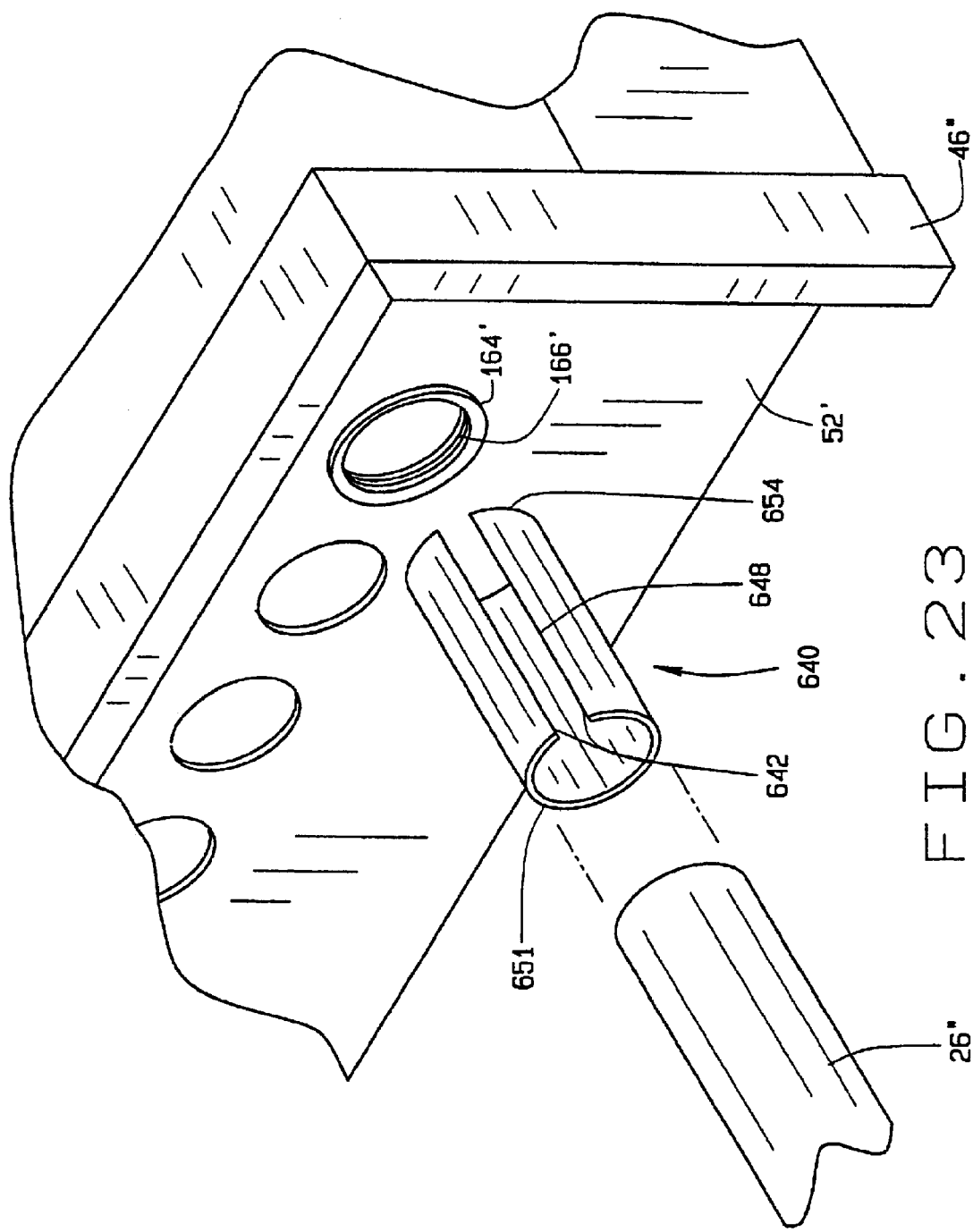

ROLLER GRILL ASSEMBLY FOR COOKING HUMAN FOOD

This application claims priority to U.S. Provisional Application No. 60/103,645 filed Oct. 9, 1998. This application is also a continuation application of U.S. patent application Ser. No. 09/414,785 filed on Oct. 8, 1999, now U.S. Pat. No. 6,393,971.

STATEMENT REGARDING FEDERALLY SPONSORED RESEARCH OR DEVELOPMENT

Not applicable.

BACKGROUND OF THE INVENTION

This invention relates to assemblies for cooking human food, and in particular to such assemblies that use heated tubes that are rotatably mounted to a housing so that food can be placed upon the roller tubes to be heated. The invention also relates to guard covers for human food cooking assemblies so that germs such as from sneezing, and contaminants in the ambient air, are blocked from impinging upon the food.

Heretofore, heating and cooking assemblies have used rotatable roller tubes for heating and cooking food. Roller tube cooking is especially adaptable to heating and cooking products that have an elongated shape, such as hot dogs and wieners. In the prior art, the roller tubes had been mounted to the housing by bearings. However, the load exerted by the tube upon such bearings has caused deformation, and has caused wear and tear upon the bearing so that grease and other liquids have passed through the bearing seals to enter other parts of the housing such as the drive assembly of the housing.

Prior roller tube heating assemblies have used drive systems that have employed a chain driven by a rotatable sprocket or gear. The chain has been connected to sprockets or gears mounted at the ends of the roller tubes so that rotation of the drive sprocket or drive gear rotates the roller tubes. In the prior art, the roller heating tubes have been mounted in a row horizontally relative to the housing, or in some cases, at an angle of about 15 degrees relative to the housing, with their central axes extending in a straight line. However, there have been problems caused by the application of the drive chain force from the drive member directly to pulling a roller tube. This has resulted in distorting the end of that roller tube, and also in distorting the bearing with which the roller tube is mounted to allow grease and liquids to pass by the bearing into enclosures such as into the area housing the drive components.

Further, with roller tubes aligned at an angle of about 15° relative to the housing in the prior art, inconvenience has arisen in an operator trying to serve food from the grill when the operator is located at the end of the grill at the upper incline of the tubes. Additionally, with a 15° incline of the tubes, food products can roll down toward the bottom of the tubes if they are bumped by a serving instrument during the serving process or a rearrangement process.

A consideration in roller grills is conservation and distribution of the heat that is applied to the roller tubes. Prior heated roller tubes have had elongated, spiral heating elements covered by sheathes, which extend through the center of the tubes. However, because heat is lost at the ends of the roller tubes, it is desirable to have a greater distribution of heat at the ends of the tubes than in the center part of the tubes to provide a more uniform temperature along the entire roller tube. There is also a need to provide heat to the roller tubes so that the food products are maintained at a sanitary temperature of 140° Fahrenheit.

Previous food cooking heating assemblies have employed controls for controlling the supply of power, controlling the temperature of the roller tubes, controlling the heating time, and using display lights to indicate the state of control members. Such controls have been mounted on a control panel of a food cooking assembly. Such controls have been exposed to view during operation, and also exposed to possible impingement or bumping by a person or by some object moved about the assembly, to change the setting of a control. In the prior art, drawers or containers have been used to store items such as buns or other foods, in proximity with a heating assembly.

Heretofore, guards have been used to cover food cooking and heating assemblies to help resist germs and contaminants from coming into contact with the food located with a heating or cooking assembly. Such guards have been comprised of transparent material, such as plastic. In the prior art, such guards have had hinged components which can be lifted to allow access to the food under the guard cover. A problem with this type of unit has been that the operators using them have, at times, lifted the component up to have access to the food, but not returned the hinged member to a lower position to better cover the food. Prior guards have had pass-through types of structure wherein there are openings at the ends of the guard with a passage connecting the openings. A problem with these guards is that one could sneeze or cough into the openings into the passage to contaminate the food, or other contaminants could float through the openings to contact the food. In the prior art, food guards have used openings covered by flaps with the guard structure including a rigid ledge connecting the bottom part of the guard beneath the opening. A problem with these types of guards is that the ledge at the bottom of the opening hinders accessibility to food and makes it more difficult to see the food.

BRIEF SUMMARY OF THE INVENTION

The present invention improves over the prior art and provides a number of advantages for heating and cooking human food, and for protecting the food from contaminants. The present invention provides a drive system for rotating tubular rollers used for heating and cooking foods. The invention provided a means for driving the roller tubes to rotate relative to the housing which include a drive member mounted to the housing and driven by a power source such as a motor. The roller tubes are provided with driving engagement structure such as a sprocket or a gear. The roller tubes are aligned in a group so that there is a roller tube at each end of the group. The invention further provides an idler member that includes a sprocket, gear, or the like, mounted with the housing as by a stud. Drive linkage such as a drive chain is drivingly connected with the drive member, with the roller tube drive engagement structure, and with the idler member. The connection is such that the direction of movement of the drive linkage is that the drive member pulls the linkage so that the linkage moves from the engagement with the roller tubes toward and about the idler member, and thence from the idler member to the drive member. In other words, the drive member is pulling the linkage in the direction from the idler member toward the drive member without any tubular heating members located in between. This arrangement thus allows the pulling force that is transmitted by the linkage from the drive member to be directly transmitted to the idler member, rather than directly transmitted to the end of one of the roller tubes. The force applied by the linkage against the idler member is transferred to the housing. After the linkage passes from the idler member to the drive member, it extends about the drive member to move next to engagement with the engagement means of the roller tubes. Reinforcing structure, such as a strut with an opening to allow passage of the linkage, can also be used in mounting the idler member to the housing to better withstand the forces of the drive linkage exerted about it, and to resist distortion of the idler member and its mounting.

The invention also provides a bearing sealing assembly for mounting the individual roller tubes in a food cooking assembly. The sealing assembly comprises a bearing member and an annular sealing member. The bearing member has a bore that receives the roller tube therethrough. The bore has a section with an annular shape to receive the annular sealing member. In the preferred embodiment, the annular member is an O-ring with an outer curved surface, and the bearing bore section that receives the O-ring has a similar curved surface, so that when the O-ring is expanded to fit about the roller tube, the O-ring outer surface rests against the conforming surface of the bore section. The bearing member can also be provided with an annular rim section with a flat surface that engages a flat surface of the housing. The bearing can further have a sleeve that extends throughout an opening in the wall of the housing, with an outwardly projecting flange extending from the sleeve on the other side of the wall so as to engage the wall.

The invention further provides for a tool and a method for mounting the bearing fittings and sealing members. The tool has a first section of cylindrical shape which is telescopically received within an end of a roller tube. The tool has a second section extending from the first section, which second section has a cylindrical outer surface. That cylindrical outer surface of the second section is about the same diameter as the roller tube outer surface. The shoulder at the juncture at the first and second tool sections can be placed to abut the end of the roller tube so that the surface of the second tool section is aligned and substantially continuous with the outer surface of the roller tube. The tool has a third section that extends from the second section. The third section is tapered with a proximal end that adjoins the second section. The third tool section has a distal end with a diameter less than that of the proximal end so that the third section has a tapered shape sized to extend through the annular sealing member, or O-ring. Preferably the third section has a frustoconical shape. To install the bearing sealing members, the bearing and the annular member, such as the O-ring can be mounted with the food grill housing. The roller tube with the mounted tool are then moved to allow the tapered end of the tool to pass through the annular sealing member, so that the annular member has its inner surface in contact with the tapered surface of the third section. The tube and tool are continued to be moved through the annular member and bearing so that the annular member expands as it slides along the tool's tapered third section until the annular member is positioned about the second section of the tool. When this occurs, the annular member has been stretched so that its outer surface fits against the conforming surface of the bearing bore section. The tool and the tube are continued to be slid through the sealing member and bearing until the inner surface of the annular sealing member fits about the tube outer surface to seal thereagainst. A lubricant can be added to the surface of the third tool section prior to inserting it within the annular member.

In another embodiment of a tool and method for mounting the bearing fittings and sealing members, a tool comprising a spring having a slotted cylindrical shape is provided. The bearing and sealing member can be mounted with an opening in the grill housing. The spring tool can then be inserted within the sealing member and bearing to exert outward force against the sealing member to stretch it and press it so that its outer surface fits against the conforming surface of the bearing bore section. Preferably, the tool is inserted through the bearing and sealing member from the side of the housing frame that is opposite the side from which the roller tube is inserted. With the tool so installed, the tubular heating member can be inserted from a position on the side of the housing frame opposite the side of insertion of the spring tool and moved within the spring tool. The spring tool in its inserted position in the O-ring has an inside diameter that is slightly greater than the outside diameter of the roller tube. After the roller tube end is inserted to extend beyond the bearing and sealing member, the spring tool can be grasped by the operator, and pulled away from the bearing and sealing member, thus leaving the roller tube inserted through the sealing member and bearing so that the roller tube exerts force against the sealing member to hold it in position within the bearing bore section. The roller tube can continue to be inserted until it passes to the point to be inserted through an aligned hole in the frame on the other side of the housing. The same method of inserting the tool within the bearing and sealing member in the other frame can then be employed.

As to another feature of the invention, the housing is provided with a control panel upon which controls, such as for controlling power to heating members, controlling the temperature of the heaters, and the time for heating, are mounted. A cover is mounted with the housing to pivot from a first position to cover the control panel, to a second position which exposes the controls for operation. A pin can be mounted with the cover and the housing with a biasing means, such as a spiral spring, used to bias the pin to engage the cover and the housing. In one embodiment, the cover has structure providing two aligned holes. The pin has a shaft section that fits through a first hole. The shaft extends into an enlarged shoulder that abuts structure about the second hole. The shoulder extends into an engagement section that passes through the second hole. The biasing means, such as a spring, has a first end abutting the pin shoulder and a second end abutting the cover structure about the first hole, so that the biasing member biases the pin shoulder to push the pin engagement section into a hole in the housing structure.

In another embodiment, the cover mounting means comprises a spring which has two legs that are joined by a bight. A boss extends from the first leg. The cover has first structure, such as a tab, with a hole therein, sized to receive the spring boss. The cover has a second structure, such as a pin, against which the second spring leg can abut. The spring legs are compressed so that the second leg abuts the second structure and the boss of the first leg passes through the hole of the first structure so that the boss is biased by the spring action in an outward direction. The boss can be installed to be inserted with a hole in the housing of conforming shape so that the cover can pivot relative to the housing.

The roller tubes can further be mounted so that their central axes are aligned to extend at an angle of about 3° to 5° relative to the housing. The central axis of the idler member of the drive assembly can also be aligned with the axes of the roller tubes as part of the alignment of from about 3° to 5°. The 3° to 5° alignment of the roller tubes allows for a convenient arrangement so that operator has a good view of the food items cooked upon the roller grill from the operator's primary work point. Additionally, the operator can serve food items from the opposite ends of the housing wherein the elevation of the rollers is higher. The 3° to 5° elevation is of a lesser incline than the 15° incline known in the prior art, so as to be less likely to encounter a problem of food items rolling down the 3° to 5° incline if they are inadvertently bumped or struck by a serving instrument.

The invention further features cover structure mounted to the frames of the housing about the ends of the roller tubes. One of these cover structures can act to cover the sprockets or other engagement means at the ends of the roller tubes as well as cover the linkage or chain of the drive assembly. The cover structures act to block heat loss from the ends of the roller tubes. The cover structure on each of the housing frames adjacent the roller tubes also provides a means for mounting the heating members that extend through the roller tubes. Openings can be provided through the structure to receive ends of the heating members to support same. The heating members can have a heating element with a wound spiral configuration. The spacing between each of the spiral winds is more compact at the ends of the element than in the center.

Moreover, a feature of the invention is providing the housing with a compartment for storing food items such as buns, or other things, within the housing. The housing has a cavity with interior structure. The compartment can be slidably mounted relative to the housing interior structure. The compartment has a pair of tracks which are mounted toward their fronts to a cover. A transverse structural connection between the tracks can also be made. The tracks fit with members associated with the housing interior structure to slide relative thereto. In the preferred embodiment, roller wheels fitting within channel-shaped tracks are provided. A pan is shaped to be supported by compartment structure, such as the tracks or structure connectors. The pan can have a gripping section and be removable. The compartment can be slid to a closed position wherein the pan is contained within the housing cavity and the cover acts to cover the controls on the control panel. In a second position, the handle of the cover is pulled to pull the cover away from the control panel so that the controls are exposed for operation, and so the pan can be removed from the compartment. The heat from the heating means can pass through the housing structure, such as the wall structure, to warm the buns or other items in the compartment, when the compartment is in the closed position.

Additionally, a feature of the invention is a guard for covering food that is located or associated with a housing. The cover has first and second legs and a top section. An opening can be provided at the front and rear of the guard. The openings at both the front and the rear are such that they extend downward to the bottom of the legs so that the lower ends of the opening are not blocked by any connecting structure. Flaps can be pivotally mounted to both openings. The flaps can have lugs which fit within voids in the guard structure. In a preferred embodiment, the lugs are toward the tops of the flaps, and the openings are in corner sections adjacent the openings. The front and rear flaps can rest on the structure about the front and rear ends, respectively, that resist further pivotal movement. The bottom of the guard can be formed with structure that fits over part of the housing to resist movement of the guard relative to the housing. In a preferred embodiment, horizontal ledges can be provided at the bottom of the sides, with depending structure fitting about the sides of the housing. Each flap can have a handle section. The guard can be made of transparent plastic so that the operator has a better view of the contents that are with the housing.

BRIEF DESCRIPTION OF THE SEVERAL VIEWS OF THE DRAWINGS

The objects of the invention are achieved as set forth in the illustrative embodiments shown in the drawings which form a part of the specification. In the drawings:

FIG. 11 is an orthogonal projection of a part of one of the cooking roller tubes, with a bearing ring and O-ring mounted near the end thereof;

FIG. 11A is an exploded view of a bearing and an O-ring, and an O-ring and bearing mounting assembly shown engaged with a roller tube, with the tube shown in section;

FIG. 11B is a view showing the installation of an O-ring and bearing with the mounting tool engaged to a roller tube shown in section;

FIG. 11C is a sectional view showing the bearing cover and O-ring mounted about a roller tube, with the bearing installed with an interior side wall of the assembly;

FIG. 12 is a view, partially in section, showing a mounting pin for the front cover engaged with an inside wall of the roller grill;

FIG. 13 is a sectional view of a heating element for a roller tube;

FIG. 14 is a sectional view of a roller of the invention;

FIG. 15 is a side elevation, shown broken, with the sneeze guard cover mounted, and with the flaps shown pivoted upwardly;

FIG. 16 is an orthogonal projection of an alternative embodiment of the roller grill assembly of the invention, with the sneeze guard cover removed;

FIG. 20 is an isolated view of a spring ensemble with boss for an alternative embodiment of the means to pivotally mount the cover;

FIG. 21 is a side elevation showing an alternative embodiment of a cover for use with the spring ensemble of FIG. 20;

FIG. 22 is a partial rear elevation view of the cover isolated from the assembly, showing the spring ensemble installed with the cover; and FIG. 23 is an exploded view showing an alternative embodiment of a tool and method for mounting a roller tube with a bearing fitting and O-ring, with the tool being shown toward the outside of the housing frame member depicted for purposes of clarity, rather than on the inside of that frame member, which is the preferable direction of insertion of the tool into the O-ring and bearing fitting.

Corresponding reference characters indicate corresponding parts throughout the several views of the drawings.

DETAILED DESCRIPTION OF INVENTION

Figure 1:
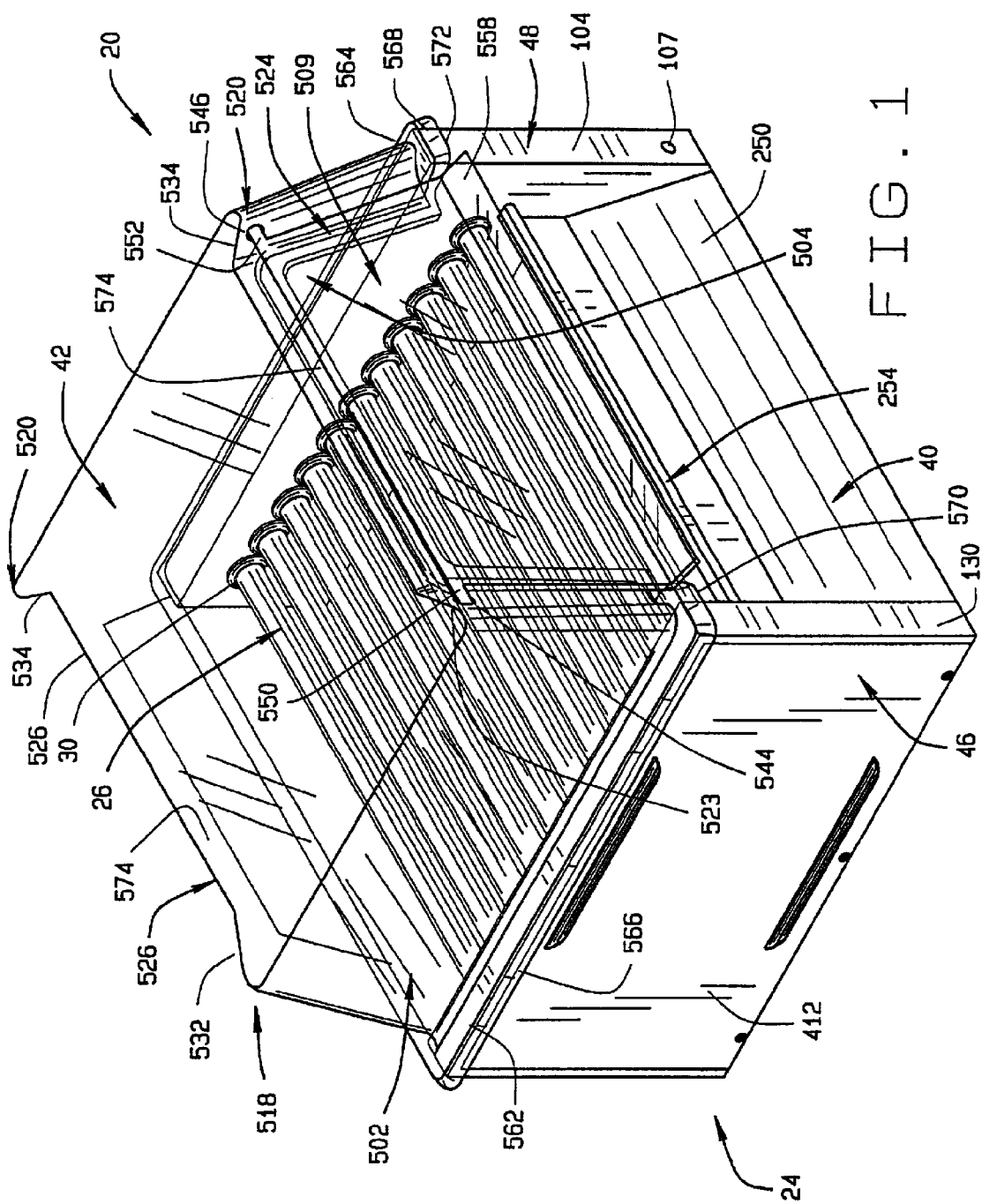
FIG. 1 is an orthogonal projection of the roller grill assembly of the invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Overall General Description

First, an overall general description will be given. With reference to FIGS. 1–15 of the drawings, the roller grill assembly for cooking human food is generally designated 20. The assembly 20 generally comprises a main housing 24, upon which are mounted a plurality of rotatable tubular cooking members 26, including tube heating members 28; roller tube sealing subassemblies 30, a roller tube drive assembly 32, including a strategically positioned idler sprocket or gear 36; a control assembly 38, a control panel cover 40, and a sneeze guard cover 42.

The housing 24 comprises a central horizontal base sheet 44 (FIG. 10) and two generally rectangular side support frames 46 and 48. Each of the side support frames 46 and 48 are made of a rigid material such as stainless steel and can be stamped so that they each have interior side walls 50 and 52, respectively. The base sheet 44 has depending side flanges such as indicated as 54 in FIG. 10 which are secured as by screws to the side frame interior walls 50 and 52. The front end of base sheet 44 extends into an integral U-shaped channel 58, while the rear of the sheet 44 extends in a smaller integral U-shaped channel 60. Sheet 44 can have vent holes (not shown) formed therethrough for allowing air circulation from the exterior to within the interior of the housing 24.

The housing 24 further comprises an integral L-shaped member 64, formed of rigid material, illustrated in this preferred embodiment to be of stainless steel. The L-member 64 has a rear wall 66 which extends downwardly into a horizontal flanged foot 68 that is secured to the bottom of base channel 60 as by screws 70. The L-shaped housing member 64 further comprises a horizontal wall 74 that extends forwardly from the top of rear wall 66. At the front of horizontal wall 74 is an integral U-shaped channel 76. The walls 66 and 74 both have inwardly extending side flanges (not shown) that are flush with the frame side walls 50 and 52 and secured thereto by screws, rivets and/or spot welding. A separate grease drip tray 78 can rest on wall 74 beneath the roller tubes 26 to catch grease and fluids dripping therefrom.

Towards its front, the housing 24 comprises a control panel 80 which has a middle wall section 82 that extends rearwardly at an angle of about 15° to 20° relative to the base 44. Extending rearwardly from the bottom of the panel wall 82 is a horizontal flanged foot 84, which is secured as by screws to base sheet 44. Projecting forwardly from the top of panel wall 80 is a horizontal flange 88 that is secured as by screws to the bottom of U-channel 76. The panel wall 82 has rearwardly extending flanges (not shown) which are secured as by screws to the side frame interior walls 50 and 52.

The control assembly 38 comprises temperature controls 92 and 94, with knobs 93 and 95 respectively, for controlling the temperature of the roller tubes, as will be later described. The knobs 93 and 95 are rotatably mounted to the control panel wall 82. Mounted to panel wall 82 between each of the knobs 93 and 95 is an on/off switch 96. The control assembly 38 further comprises pilot lights 97 and 98 mounted above each of the control knobs 93 and 95, respectively, for indicating when the respective controls 92 and 94 are activated. The controls 92 and 94 regulate the flow of electrical current to the heating members 28 located within the roller tubes 26, as will be later described.

Now a more specific discussion of the side frame 48 is given. Extending outwardly from the front and rear edges of frame interior side wall 52 are front facing frame wall 104 and rear facing frame wall 106, respectively. Control assembly 38 also comprises a pilot light 107 mounted on frame front wall 104. Front frame wall 104 and rear frame wall 106, each have projecting from their outer edge a channel 108 and 110, respectively, with inwardly extending lip flanges 112 and 114 projecting respectively from the channels 108 and 110 at their ends A floor frame wall 120 extends outwardly from the bottom of frame interior wall 52, and has at its outer end an upwardly extending flange 122. A pair of cylindrical legs 124 are secured to floor wall 120 as by threaded bolts extending through holes in wall 120, with a nut on the interior of wall 120. A frame top wall 126 projects horizontally from the upper edge of frame side wall 52. A vertical flange 128 depends from the outer edge of top wall 126.

The structure of left side frame 46 is a mirror image of that of side frame 48. Front and rear walls 130 and 132 project from the front and rear edges of side wall 50, respectively. Front and rear walls 130 and 132 have respective channels 134 and 136, having end lip flanges 138 and 140, respectively. A horizontal floor wall 142 extends from the bottom of wall 50, and has an upwardly extending flange 144. A pair of cylindrical legs 146 are secured to floor wall 142 in the same fashion as described for floor wall 120. From the top edge of side wall 50 projects a top wall 150 with a depending flange 152.

Secured within each of the support frames 46 and 48, to the side frame walls 50 and 52, are structural reinforcement channels 154 and 156, respectively. Each channel extends at an angle of about 70° relative to the frame floor walls 120 and 142, respectively, and are secured to the side walls 50 and 52 as by spot welding. The channel 154 has a flat central section that fits flush against wall 50, and two side flanges 157 and 158. Channel 156 differs from channel 154. Channel 156 has a flat central section 159 that fits flush against wall 50, and has a front flange 160. Channel 156 has a pair of angled extensions 161 and 162 that project from the rear edge of section 159, with an opening 163 formed between extensions 161 and 162.

Each of the frame side walls 50 and 52 have a plurality of holes which are aligned at an angle of about 3° to 5° relative to the horizontal frame floor walls 120 and 142. These holes are for mounting the rotatable cooking tubes 26 with the tube sealing subassemblies 30. Toward this end, each of the said holes is provided with a roller tube sealing subassembly 30. Each subassembly 30, as shown in FIGS. 11, 11A, 11B and 11C, comprises a bearing fitting 164 and an O-ring 166. The bearing 164 has an outer cylindrical sleeve 168 having a cylindrical bore 170. The cylindrical sleeve section 168 extends inwardly towards the center of the tube 26 into an annular rim section 174 which has a flat annular outer surface 176 and a curved, tapered inner surface 178.

The cylindrical bore 170 extends inwardly into a bore section 180 that has an arcuate semicircular surface 182 shaped to receive the outer curved surface of O-ring 166. The bore section 180 then extends into an inner bore section 183 of about the same diameter as bore 170.

Each roller tube sealing subassembly 30 is mounted to roller tube 26 in a manner to be described, so that the subassembly fits about the roller tube such as shown in FIGS. 11 and 11C. In this installed position the tube 26, as illustrated in FIG. 11C, has the inner surface of the O-ring 166 fitting flush against the outer surface 184 of tube 26. The bearing flat outer surface 176 fits flush against the outside surface of frame member 50. Cylindrical bearing section 168 extends through its corresponding hole in frame side wall 50. The outer edge of cylindrical bearing section 168 can have an annular flange 185 to fit against the interior surface of side wall 50. Flange 185 can have an antirotation notch 186 that can interlock with a tab (not shown) in wall 52 as known in the art. One such tab 185 is shown in FIGS. 11A–11C. The tabs 185 are spaced from one another so that when they are pressed through the holes in side walls 50 and 52, they expand outwardly to help anchor the bearings 164 to the side walls 50 and 52. The bearing fitting 164 can be of plastic such as polytetrafluoroethylene. The O-ring 166 can be of rubber like material such as silicone rubber.

Figure 2:
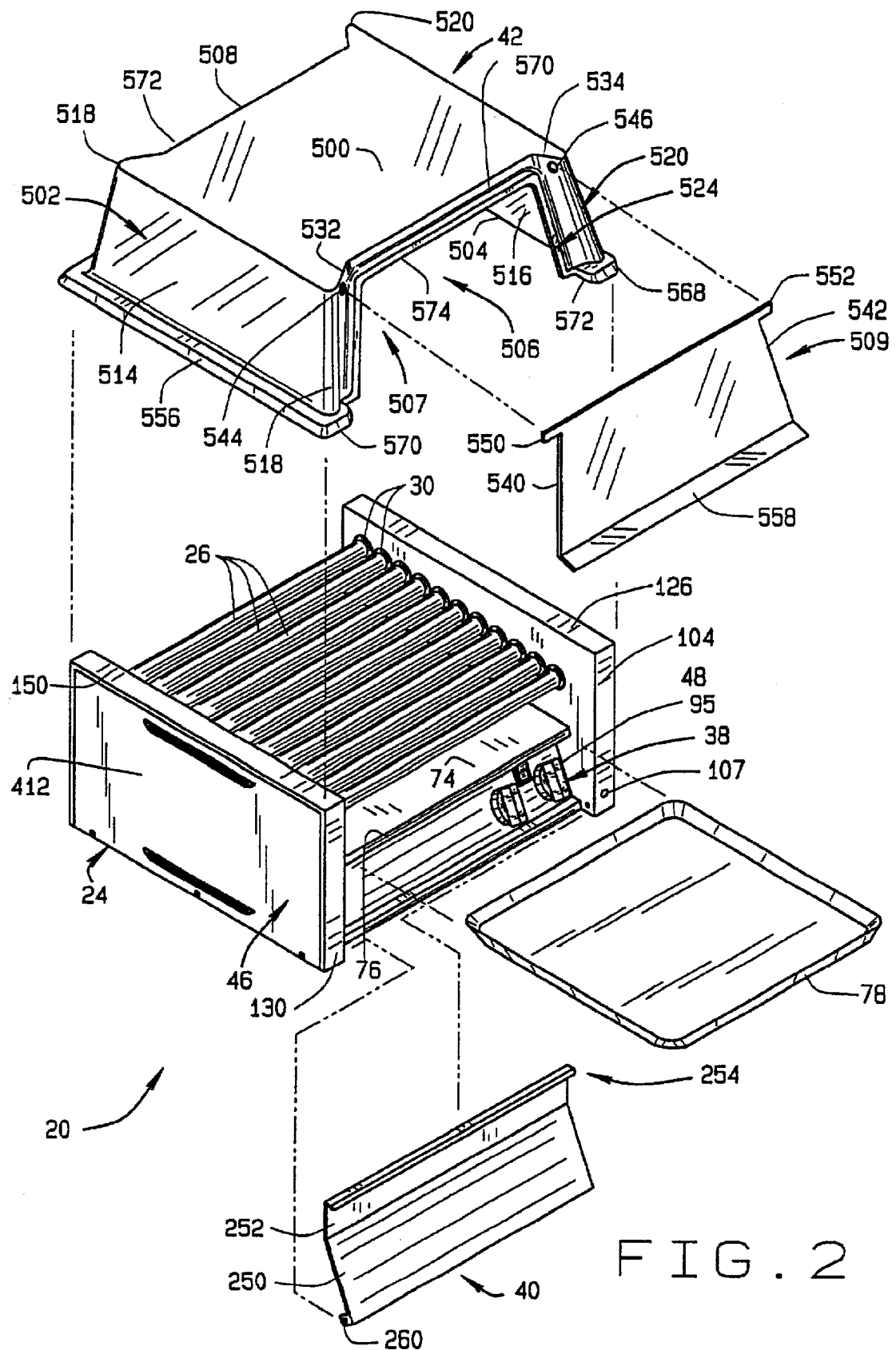
FIG. 2 is an exploded view of the assembly of FIG. 1.
Figure 6:
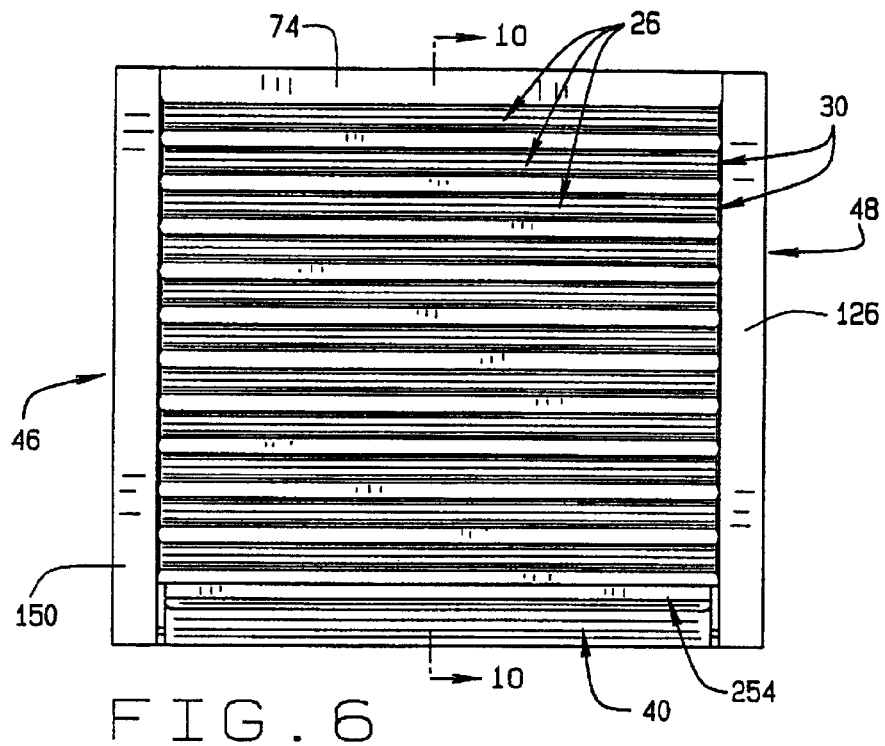
FIG. 6 is a top elevation of the assembly of FIG. 1, with the sneeze guard cover removed.
Figure 9:
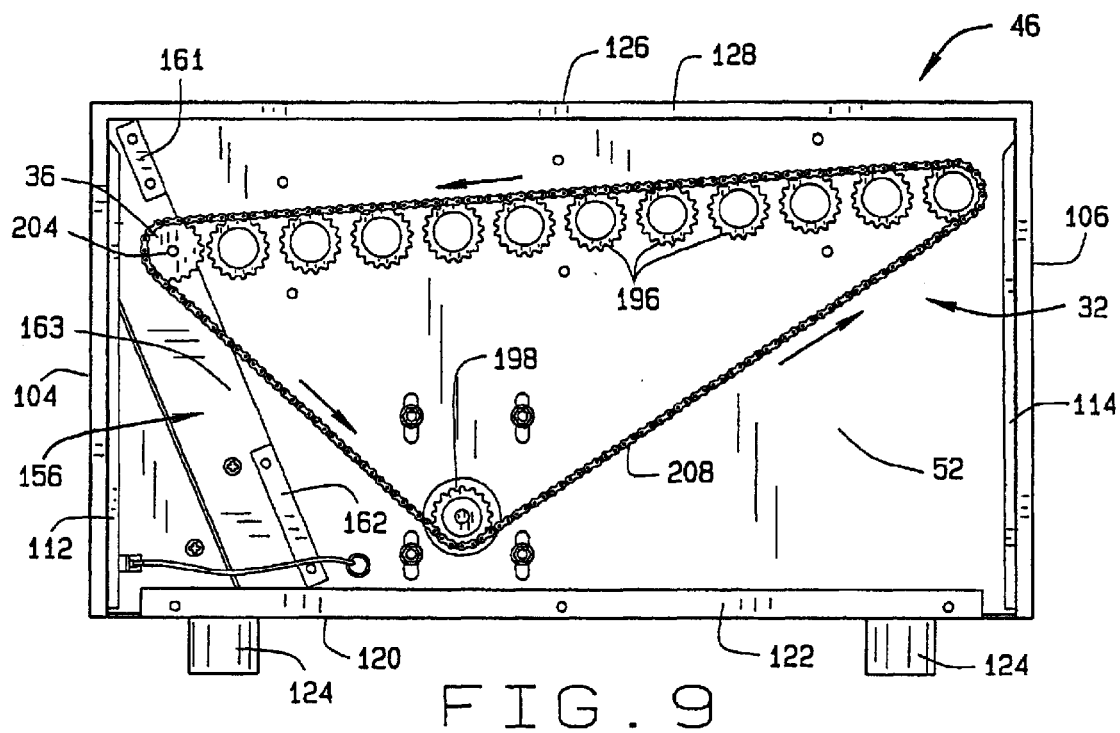
FIG. 9 is a side elevation of the left side of the assembly as viewed to the left of FIG. 1, as in FIG. 8, but with the geartrain cover and heating element connections also removed.

The roller tubes 26 illustrated in the drawings have cylindrical end sections 194 at their left ends as viewed looking at FIGS. 1, 2 and 6, while at their right ends, each of the roller tubes has formed integrally therewith a sprocket or gear 196 which is part of the roller tube drive assembly 32. Drive assembly 32 further comprises a driving sprocket 198 which is drivingly engaged with a shaft of motor 200. Motor 200 is mounted by known means to the frame side wall 52 such as by nuts and bolts. The drive assembly 32 further comprises the strategically mounted idler sprocket or gear 36. The sprocket 36 is mounted to the frame side wall 52 and to the channel 156 as by a stud 204 that is mounted to side wall 52 and through the central channel wall 159. The drive assembly also comprises drive chain 208. Drive chain 208 extends from the drive sprocket 198 through the opening 163 in channel 156 on to idler sprocket 204 and thence to the tube sprockets 196 as shown specifically in FIG. 9. The idler sprocket 36 is mounted so that its mounting screw or bolt 204 is aligned with the axis of the roller tubes 26. As seen in FIG. 9, the central axis of the plurality of roller tubes 26 are aligned so that together an imaginary line extending through said central axes and idler sprocket is at an angle of about 3° to 5° relative to the housing base wall 44 and also relative to the frame floor walls 120 and 142. The angle of the tubes 26 can be in the opposite direction if desired, depending upon the desired placement of the assembly for display and use. In operation, the motor drives the chain 208 in the direction of the arrows in FIG. 9 so that idler sprocket 36 and roller tube sprockets 196 are rotated to rotate the tubes 26. As can be seen in FIG. 9, the use of the idler gear 36 allows the drive force applied through chain 208 in the direction of the idler sprocket 36 toward the drive sprocket 198, to be applied against the idler sprocket 36, and hence to side frame 48, rather than against one of the sprockets 196 of a roller tube 26. This thus reduces wear and tear against any bearings used to mount the roller tubes 26, and against the roller tubes 26 and their sprockets 196 as well. The mounting of the idler gear 36 to the structural reinforcement channel 156 also helps to provide increased stability and resistance against the driving force of the chain 208. The reduction of the likelihood of distortion of the bearings, such as illustrated as bearings 164, thus helps to minimize or eliminate the flow of grease and the like from the area about the cooking surface of the roller tubes 26 located to the interior of the side walls 50 and 52, into the interior of the side frames 46 and 48 which could form grime and grit and the like about the drive system or heating system, and to otherwise congregate to form debris and potentially unsanitary conditions.

The idler sprocket 36 further provides better use of a single motor since a single motor would be applying more force than would be applied by each dual motor in a dual motor arrangement.

Figure 8:
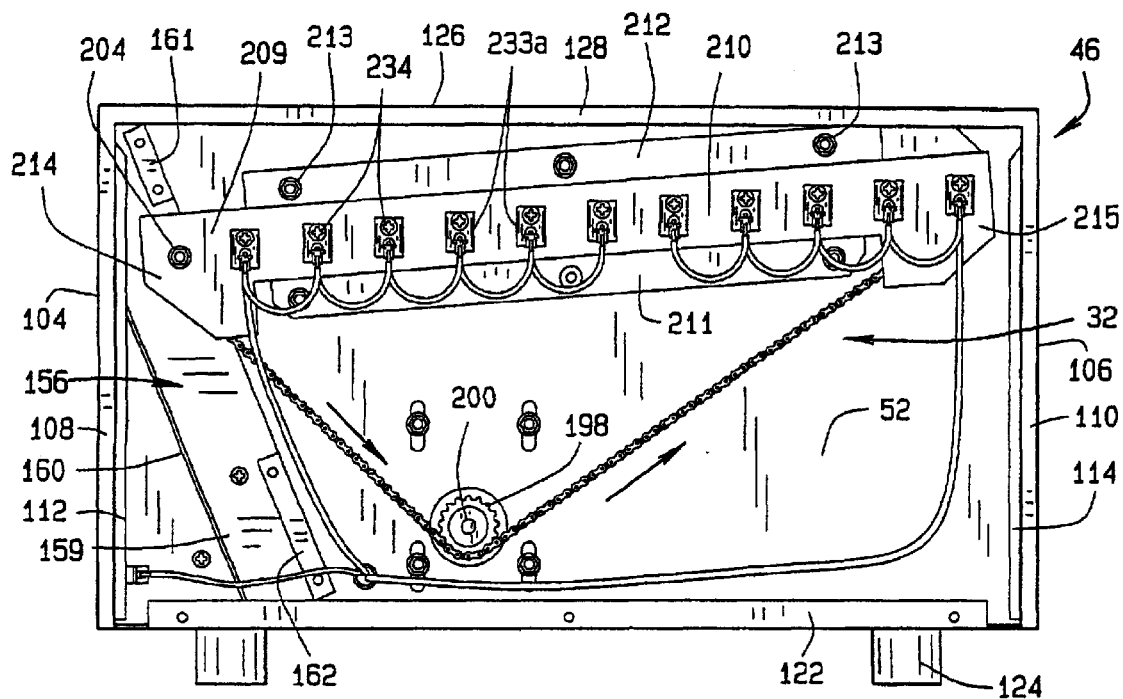
FIG. 8 is a side elevation of the left side of the assembly as viewed to the left of FIG. 1, with the sneeze guard cover removed, and with the left side outer wall disassembled and removed.

The idler sprocket 36 as well as the roller tube sprockets 196 can be covered by a protective plate 209 which also serves as a support for the tube heating members 28. Plate 209, as seen in FIG. 8, comprises a channel section with a middle wall section 210 spaced from wall 52, and a pair of channel flanges (not shown) projecting from the edges of wall 210 to be perpendicular to side wall 52, and thence extend into flanges 211 and 212, which fit flush against the outer surface of side wall 52. Nuts and bolts 213 secure the flanges 211 and 212 to side wall 52. The cover plate section 210 at its ends has trapezoidal extensions 214 and 215 which are spaced from wall 52. Trapezoid section 214 covers the idler sprocket 36 with stud 204 extending through a hole therethrough. Section 214 also covers a part of the chain 208 located between the idler sprocket 36 and drive sprocket 198. The cover plate section 215 also covers part of the chain 208 between the drive sprocket 198 and the rearmost roller tube 26.

Figure 7:
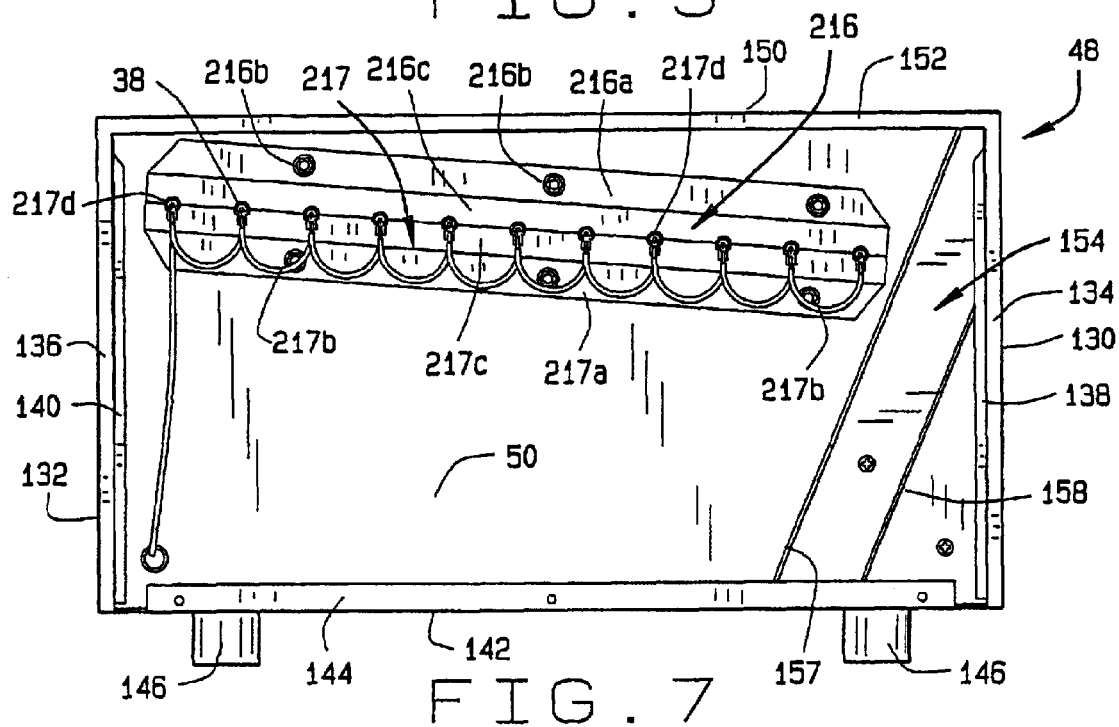
FIG. 7 is a side elevation of the right side of the assembly as viewed to the right of FIG. 1, with the sneeze guard cover removed, and with the right side outer wall disassembled and removed.

Looking now at the left side frame 46, there is also protective covering mounted to the interior side of side wall 50 to cover the ends 194 of tubes 26 and to also serve as mounting support for tube heating members 28. A pair of stepped cover plates 216 and 217 have flange plate sections 216a and 217a, respectively, which are secured by nuts and bolts 216b and 217b, respectively, to side wall 50. Plate sections 216a and 216b have outwardly projecting channel-like flanges (not shown) that project perpendicular to side wall 50 and thence extend into plate sections 216c and 217c that are parallel to the plane of wall 50 and lie in the same plane relative to each other. Arcuate notches are on the edges of the sections 216c and 217c, so that when fitted together as shown in FIG. 7, openings 217d are formed thereby to receive the ends of the tube heating members 28. The cover plates 216 and 217 act to reflect heat emanating from the tube ends 194 and the ends adjacent ends of the heating members 28, so as to better retain heat within tubes 26 and especially to maintain the heat level near the tube ends 194.

The tube heating member 28 is mounted within each of the heating tubes 26 to be centered to extend along the axis of each tube 26. Each member 28 comprises an outer heat conducting cylindrical sheath 220 of suitable material such as stainless steel. Located within sheath 220 is an electrical heating element 222 having a general spiral or helical configuration. Heat dispersing material 223, such as magnesium oxide powder, can surround the coil 222 to fill the remaining space within sheath 220. As can be seen in FIG. 13, the spacing between each of the spiral or helical winds is more compact at the outer sections 224 and 226 of the heating element 222, than in the central part of the coil 228 located between sections 224 and 226. The member 38 can have angled electrical contacts 230 and 232 connected to the straight outer cold pins 231 and 233 which are unheated pins that are connected to the outer ends of element sections 224 and 226, as seen in FIG. 13. The more compact spacing between the windings in sections 224 and 226 provide for greater wattage and thus more intense heating at the ends of the sheath 220 and hence a more intense distribution of heat at the outer ends of the roller tubes 26, than for the inner part of the roller tube 26 positioned along the less compact coil section 228. The compact nature of the windings in sections 224 and 226 is exaggerated for illustration, while the actual spacing density would gradually increase from the outer ends of sections 224 and 226 toward the center of midsection 228. This arrangement of providing more intense heat at the ends of the roller tubes 26 helps to compensate for heat lost at the open ends of the roller tubes which are mounted within the frames 46 and 48 and also lost by conduction through pins used to mount the heating element 222. Mount strips 233*a* having holes therethrough receive the sheathes 220 and can be secured thereto as by staking or crimping. The mount strips 233 fit flush against cover plate midsection 210 and can be secured thereto by screws 234 as seen in FIG. 8. The cover plate 209 acts to reflect heat emanating from the tube sprockets 196 and the adjacent ends of tubes 26 as well as from the adjoining ends of heating members 28 to better retain heat within tubes 26, and especially maintain the heat level near the ends of the tubes 26 adjacent sprockets 196.

Focusing now on the control panel cover 40 positioned toward the front of housing 20, as seen, for example, in FIGS. 2, 3, 5 and 10, the cover 40 comprises a flat central section 250 which extends upwardly into an angled section 252. Section 252 thence bends forwardly into a handle portion 254. Handle 254 has a forwardly projecting section 256 and a downwardly projecting section 258, so that handle 254 generally projects downwardly for a hook-type gripping area. A flange 259 projects rearwardly from the bottom edge of section 250.

Figure 3:
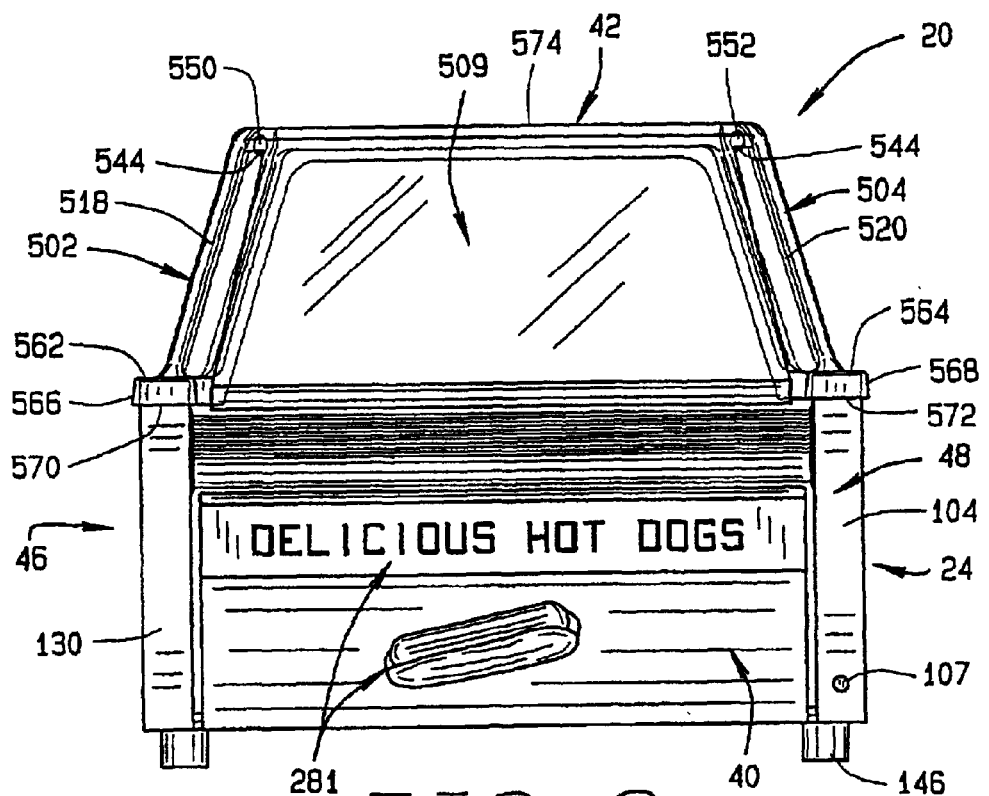
FIG. 3 is a front elevation of the assembly of FIG. 1.
Figure 4:
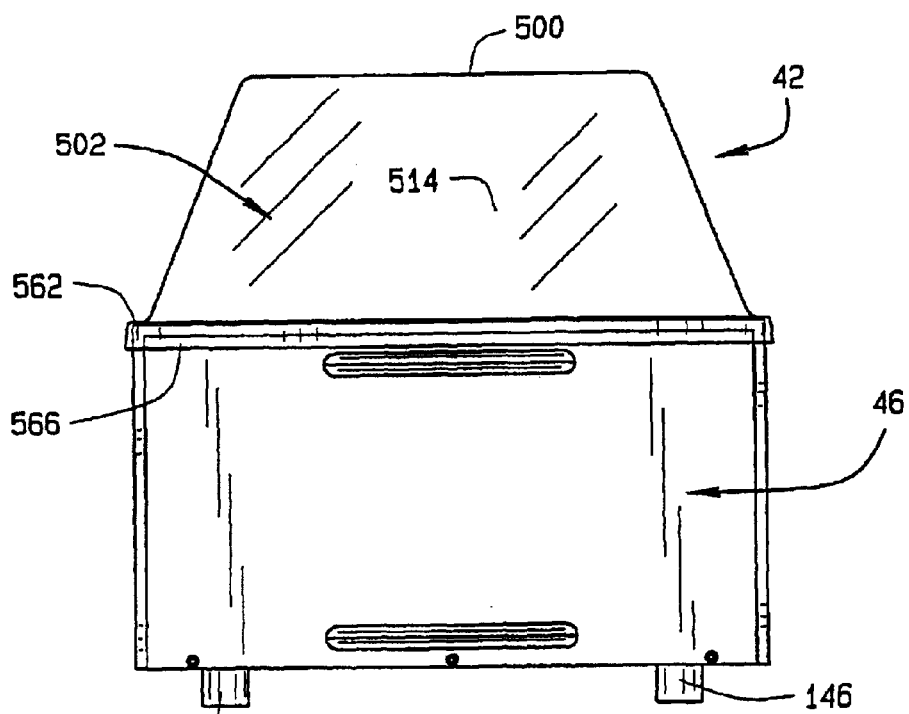
FIG. 4 is a side elevation of the left side of the assembly of FIG. 1.
Figure 5:
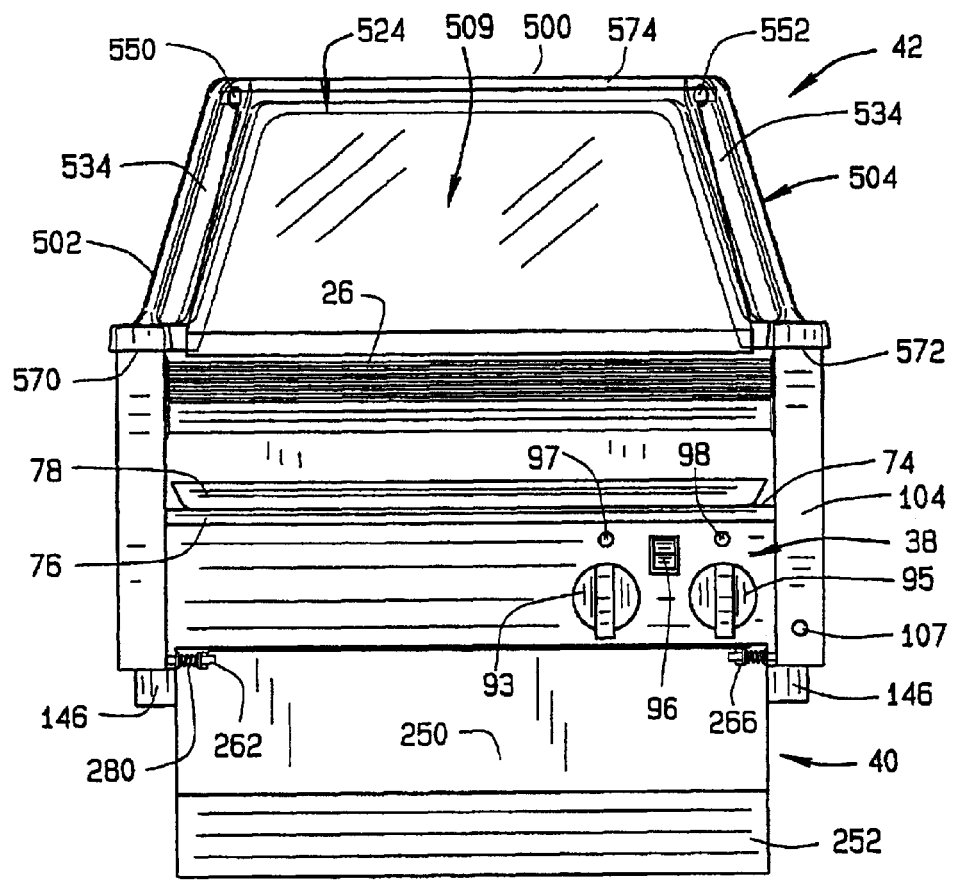
FIG. 5 is a front elevation of the assembly of FIG. 1, with the front cover panel shown in the downward position.
Figure 10:
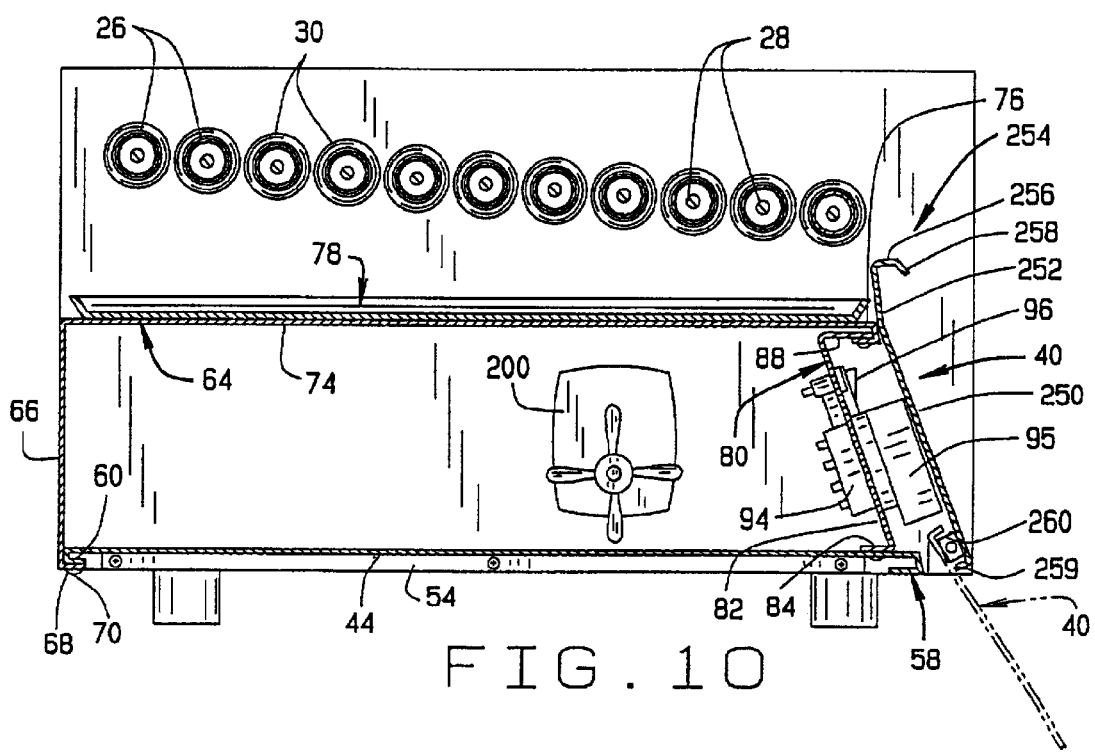
FIG. 10 is a section of the assembly of the invention with the sneeze guard cover removed, taken on the line 10—10 of FIG. 6.

Means are provided for detachably mounting the cover 40 to the housing 24. At the lower end of the outer edges of cover section 250 are a pair of integral tabs 260 which have holes therethrough for receiving corresponding mounting pins 262, as seen more clearly for one pin 262 in FIG. 12. To the inside of cover section 250 are L-shaped mount brackets 264 each having an arm 266 with a hole therethrough that is aligned with a hole in tab 260 to receive a corresponding lock pin 262. The foot 268 of each L-bracket 264 is secured to the inside of wall 250 as by spot welding. Each pin 262 has a shaft section 270 which can be of ³⁄₁₆ inch diameter. Section 270 extends into an enlarged cylindrical shoulder section 272 which has an annular surface 274. Shoulder section 272 then extends into an cylindrical bulb distal section 278 having a tapered end. Bulb section 278 is of smaller diameter than shoulder section 272. The fit of bulb 278 within the hole in tab 260 is telescopically snug. A pin biasing means, illustrated as a spiral spring 280, has its distal end abutting against pin shoulder surface 274 and its proximal end abutting bracket arm 266 as seen in FIG. 12. The spring 280 thus applies force against the pin shoulder surface 274 to bias pin 262 into a lock hole 286 located in each of the frame side walls 50 and 52 toward the bottom thereof, as seen in FIG. 12 for wall 50. The bracket arm 266 is spaced about one inch from tab 260. The hole receiving the pin shaft 270 is of larger diameter, such as ¼ inch, than the diameter of shaft 270. This permits the pin 262 to be installed by passing the proximal pin end on shaft 270 through the larger hole in bracket arm 270 to compress spring 280 so that the entire bulb section 278 fits inside tab 260. The bulb end 278 can then be swung to alignment with the hole in tab 260 so that the spring 280 urges the bulb 278 through the hole in tab 260. The bracket arm 266 and tab 260 can be spaced about one inch apart. This releasable pin mounting allows the cover 40 to pivot relative to the side frames 46 and 48 to a downward position such as shown in FIGS. 5 and 10 (phantom lines in FIG. 10) to a closed position such as shown in FIGS. 1, 3, 5 and in solid lines in FIG. 10. The releasable pin mounting allows the pin bulb section 278 to be easily retracted from its corresponding wall 50 and 52, so that the cover 40 can be disengaged from the housing 24.

The front surface 264 of cover 40 can have artwork, writing, insignias and designs thereon, such as illustrated as 281 in FIG. 3, to operate as a promotional display for the products, such as hot dogs, cooked on the roller grill, or to provide other information or aesthetics. As seen in the drawings, when the cover 40 is in the closed position, such as FIGS. 3 and 10, it covers up the controls of the control assembly 38, and also blocks the front view of the drip tray 78, to provide for a more attractive and aesthetic display.

The modification of FIG. 16 is similar to that of FIGS. 1–15, except the angle of inclination of the roller tubes 26*a'* is reversed from that of FIGS. 1–15. In FIG. 16, the higher end of elevation of the roller tubes 26*a'* is toward the front of assembly 20*a'* at the same end where the control panel 40*a'* is located. This assembly 20*a'* can be used in cases where the person serving and moving the food will be located more to the rear of the assembly.

Figure 17:
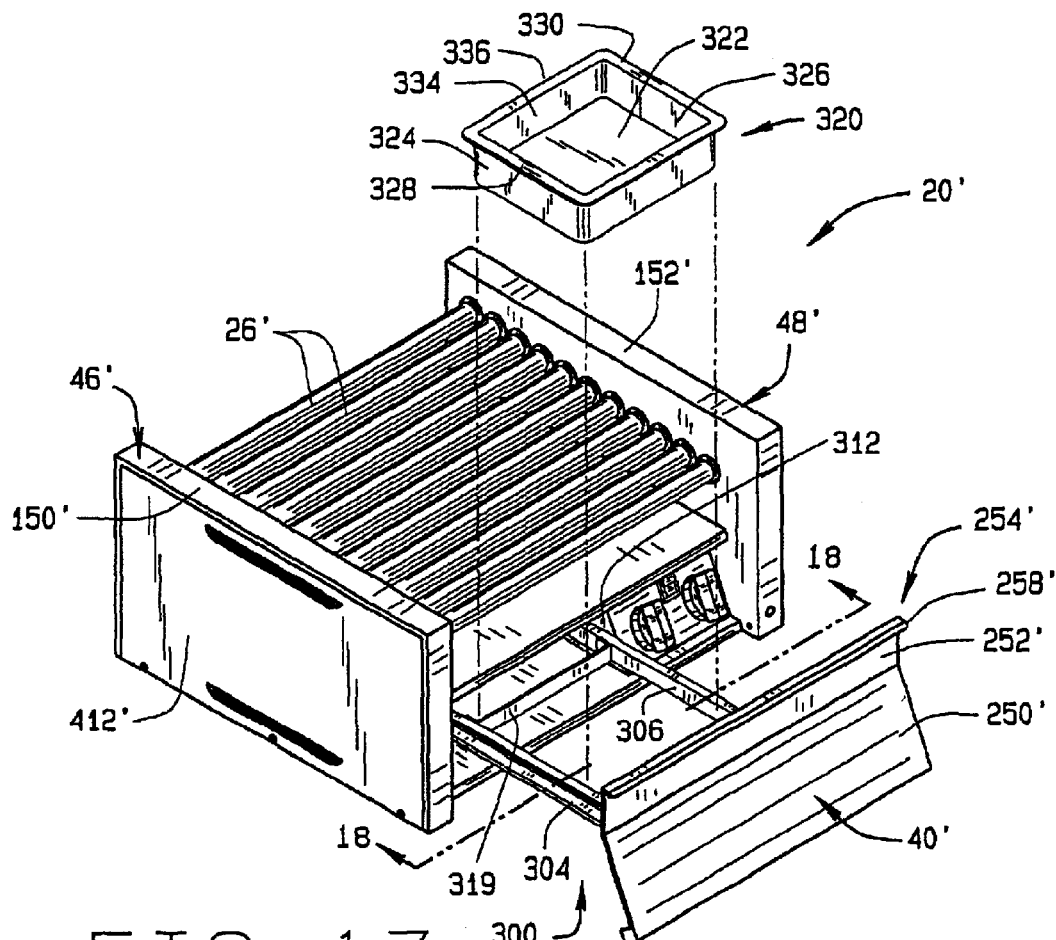
FIG. 17 is an orthogonal projection of another alternative embodiment, with the front cover panel shown extended frontwardly, and with a compartment connected therewith in view.
Figure 18:
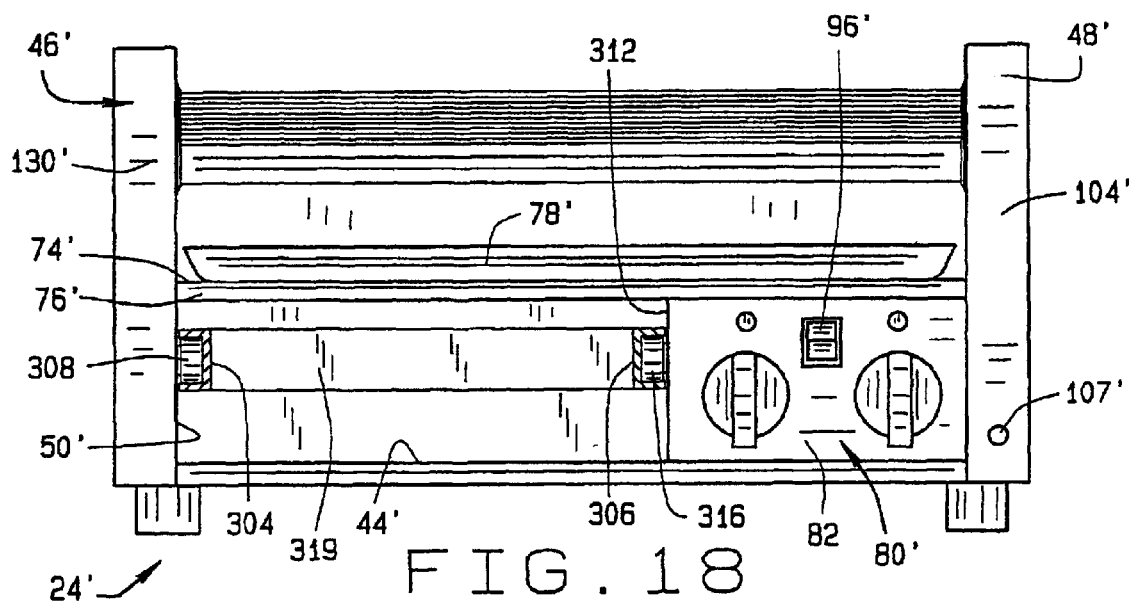
FIG. 18 is a section of the alternative embodiment of the assembly of FIG. 17, illustrating the mounting of the movable compartment.

Now attention is directed to the modifications of FIGS. 17–18. FIGS. 17–18 show a modified assembly 20' which has side frames 46' and 48' as heretofore described. The modification of FIGS. 17–18 differs from that of FIGS. 1–15 in that assembly 40' has a concealed compartment assembly 300 which allows for storage of food items such as buns, and further provides such food items be heated from the warmth of the heated roller tubes 26. The assembly 20' has a cover 40' of the same configuration as cover 40 as to the shape of the handle 254', as well as sections 252', 250' and 259'. The front of cover 40' can have artwork, insignia, writing and designs such as illustrated as 281 for cover 40. The rear of cover section 252' has secured to its rear side a pair of channel-shaped track members 304 and 306. A plurality of rotatable roller wheels 308 are mounted to the exterior side of side wall 50' of side frame 46', such as by nuts and bolts. The control panel 80' of assembly 20' is located to the right side of the assembly 20' as shown in FIGS. 17–18. The control panel mid-wall section 82' has a wall 312 projecting rearwardly from the left side thereof, as seen in FIG. 17, the bottom edge of which extends into a flange that is secured as by screws (not shown) to the base sheet 44'. Rotatable roller wheels 316 are mounted as by nuts and bolts to wall 312. As seen in FIG. 18, the roller wheels 308 and 316 fit within the tracks 304 and 306, respectively, so that the tracks 304 and 306 can roll along wheels 308 and 316. A cross strut 319 has flanges at its outer ends that are secured to the vertical walls of tracks 304 and 306 as by spot welding. A removable pan 320 is supported by the tracks 304 and 306.

The pan 320 has a bottom 322 and upstanding side walls 324 and 326, which at their upper ends, extend outwardly into flanged rim sections 328 and 330. The flanges 328 and 330 rest on the tops of channel tracks 304 and 316, as seen in FIG. 18, to be supported thereby. Pan 320 likewise has a rear wall 334 with flange 336 that rests on the top of strut 319. Pan 320 has a front wall which also has a flanged rim. The tracks 304 and 306, and cross strut 319 form a rigid structure with cover 40'.

When the cover 40' is moved to and fro relative to the side frames 46' and 48', the tracks 304 and 306 roll upon the rollers 308 and 316 to allow the pan 320 to be exposed such as shown in FIG. 17. This allows buns and other food items to be easily removed therefrom. When the cover 40' is moved to the closed position, such as shown in FIG. 16, the buns and the like within the pan can be warmed from the radiant heat from heated tubes 26, as well as from conductive heat conducted through the side frames 46' and 48' through the cover and the other housing members located about the pan 320. When closed, the cover 40' blocks the view of the control panel and of the drip tray 78.

Turning now to the installation of the O-rings 166 and the bearing fittings 164, an illustration is provided with FIGS. 11–11C. A special mounting tool 400 is provided. Tool 400 has a central cylindrical section 402 that is approximately the same diameter as the outside diameter of tube 26 so that the surface thereof can be aligned with the tube surface 184 as shown in FIGS. 11A–11B. Tool section 402 extends to the right in the drawings into a smaller cylindrical section 404 that can be telescopically slid within the tube 26 with its outer surface sliding along the inner surface 409 of tube 26, to be received in the position such as shown in FIGS. 11A and 11B. Toward the other end, tool midsection 402 extends into a tapered section 406 which has a flat end surface 408. Tool 400 can be constructed of rigid material such as aluminum.

The use of the tool 400 allows installation of the O-ring and bearing fitting without the inconvenience of the O-ring popping out of the mount bearing. In use, a lubricant, such as a silicone lubricant, can be applied to the surface of tool section 406. The bearing 164 is installed in a hole in wall 50. The O-ring is then placed within the bearing bore section 180. The tool 400 is then installed to fit with a tube 26 as described for FIGS. 11A–11B. The tube 26 and tool 400 are then moved toward the bearing 164 and O-ring 166 until the O-ring extends about tool section 402 (FIG. 11B). From that location the tube 26 and tool 400 can continue to be moved so that as the O-ring 166 slides beyond the tool midsection 402, it smoothly slides upon the roller tube outer surface 184 without bumping or dragging against the end of the tube 26. The surface of tubes 26 can be coated with a layer 410 of chrome alloy as known in the art or by a layer of an appropriate PTFE material (polymer of tetrafluoroethylene), on a steel tube 411.

The side frames 46 and 48 are enclosed by the mounting of enclosure panel 412. A description of mounting panel 412 to frame 46 suffices to describe that to frame 48. The panel 412 has an inwardly extending perimeter flange. The top of panel 412 fits behind frame flange 152. The side ends of panel 412 fit against flanges 138 and 140. The bottom of panel 412 fits against the outside of flange 144 and is secured thereto as by screws.

Figure 19:
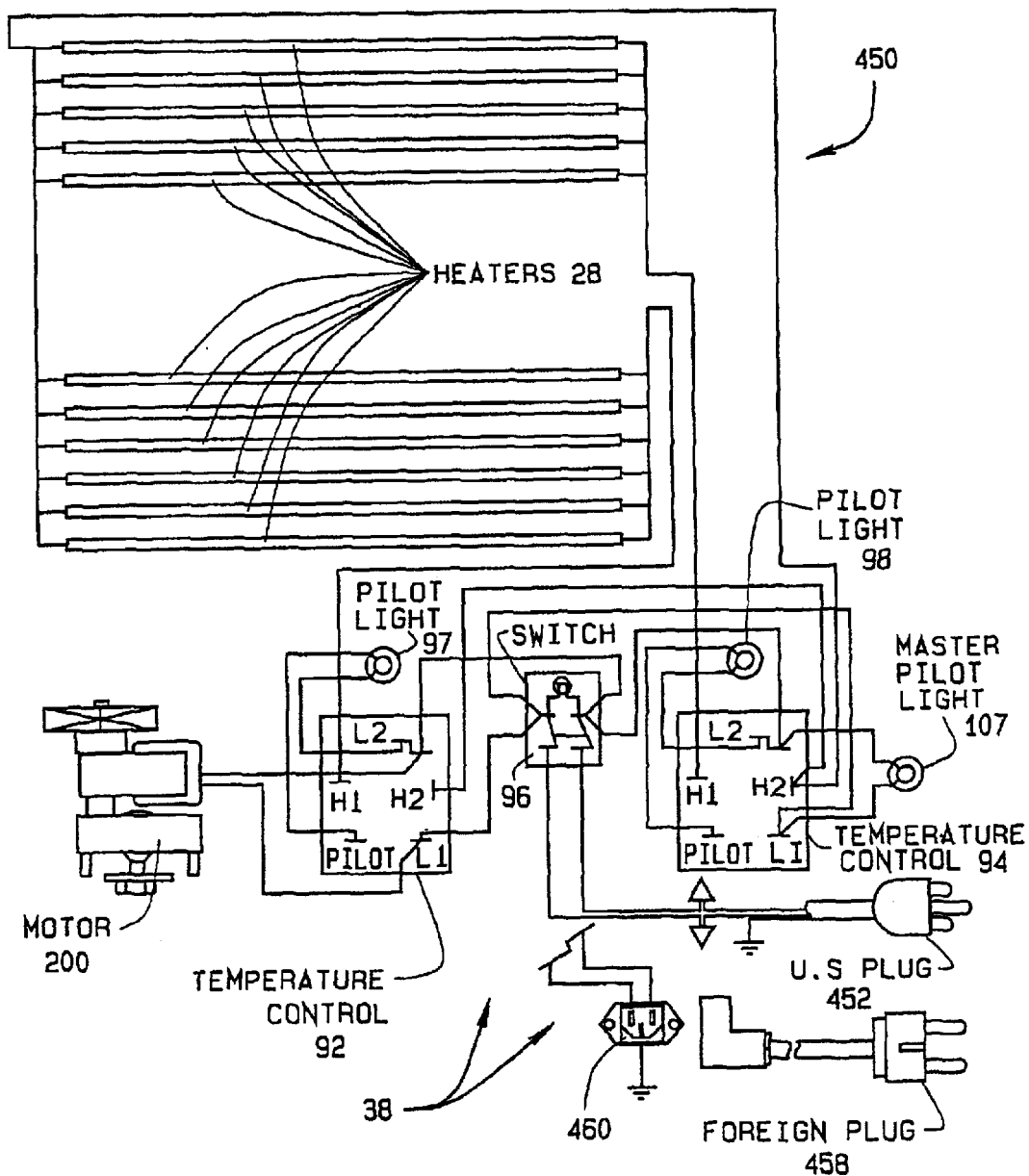
FIG. 19 is a schematic diagram of the circuitry for the assembly.

The electrical circuitry 450 for the assembly is depicted in FIG. 19. The tube heating members 28 are illustrated with the electrical connections divided into two branches. The rear group of five tube heating members 28 corresponds to the five rearwardly located roller tubes 26 as viewed looking in the drawings, and the front group comprising six heating members 28 corresponds with the front six roller tubes 26 in the drawings. The temperature controls 92 and 94 are illustrated. The controls 92 and 94 can be infinite controls such as manufactured by E.G.O. ELEKTRO-GERATEBAU GmbH, Model No. 50.59130. Controls 92 and 94 provide a more linear range of adjustment in the desired food holding range of 15% to 50% of rated input. The electrical plug 452 and the connections 454 from the cord to the internal wiring of the assembly are illustrated. A plug 458 and receptacle 460 for foreign use are also illustrated. The wiring from the main switch, or power switch, 96 to the temperature controls 92 and 94 and to the motor 200 is illustrated as well. The pilot lights 97 and 98 are electrically connected to the controls 92 and 94 so that said pilot lights are lit when their corresponding temperature controls 92 and 94 are in the "on" position to any degree. The power light 107, illustrated as being to the front of the side frames 48 and 48', is lit when the main switch 96 is in the "on" position to power the motor 200, regardless of whether the temperature controls 92 or 94 are activated to provide any electrical current to the heating members 28. The general pilot light 107 is in view even when the panel covers 40 and 40' are closed.

The temperature controls 92 and 94 allow greater control toward the higher temperature ranges. Preferably temperatures of 140° F. are required for sanitation for the center of the product that is being cooked upon the roller tubes, such as hot dogs, sausage, ground meat or the like. The setting required to obtain the temperature of 140° F. for the center of the product varies because of variance in product size and the constituency of the product, and whether there is a cover over the product, such as a sneeze guard.

The sneeze guard 42 will now be described. Sneeze guard 42 can be made of transparent plastic, such as polycarbonate. The sneeze guard cover 42 is shown mounted to the housing 24 in FIGS. 1, 3, 4, 5 and 15. The sneeze guard 42 mounts in the same fashion to the housing 24' of FIGS. 16–18. Sneeze cover 42 has a generally flat roof 500 which generally has left leg supports 502 and right leg supports 504. An open passageway 506 is formed between the leg supports 502 and 504. The passageway 506 has a front opening 507 as well as a rear opening 508. Flaps 509 and 510 can be pivotally mounted about the passageway openings 507 and 508.

More specifically, each legs support 502 has sloped side walls 514 and 516 which, at their front and rear, have generally triangular-like projected corners 518 and 520. The triangular corners 518 and 520 extend inwardly at both the front and rear of the cover 42 so that generally trapezoidal recessed areas 524 and 526 are located at the front and rear of the cover 42, respectively, for receiving the generally trapezoidal-shaped flaps 509 and 510.

Triangular corner sides 532 and 534 angle inwardly towards the passageway openings 507 and 508 so that the angled edges 540 and 542 of the flaps 509 and 510 fit to the interior of said corner sides 532 and 534. At the upper ends of the sides 532 and 534 are holes 544 and 546 which received projecting lugs 550 and 552 located at the top of the flap edges 540 and 542 as shown, for example, if FIG. 2. Because the plastic flaps 507 are flexible, one of the lugs, such as lug 550, can be inserted in a hole, such as hole 544, and the flap bent slightly so that the other lug, such as 552, can be inserted into hole 546. Each flap 507 has an angled handle section 558 at its bottom for easy grasping thereof so as to pivot the flaps to the upward position such as illustrated in FIG. 15, so that the hand can be extended through the passageway openings 507 and 508 to grasp food located on the roller tubes 26. The side walls 514 and 516 as well as the corners 518 and 520 extend downwardly to the bottom of the cover 42 and project outwardly into horizontal foot ledges 562 and 564 that have a width to cover the top walls 150 and 126 of side frames 46 and 48. The horizontal foot ledges 562 and 564 at their outer edges depend vertically into a toe sheet section 566 and 568 which extends about the outside edges of frame top walls 150 and 126 as well as frame front walls 130 and 104 and rear walls 132 and 106. The toe section also extends about one inch inwardly along the frame inside walls 50 and 52 to form recesses 570 and 572 with a recessed trapezoidal outlined wall 574 that extends about each of the passageway openings 507 and 508.

The cover 42 can be easily lifted by hand and totally removed from the housing 24 to allow inspection of the roller tubes. As can be seen, there is no interfering cross brace structure connecting the side legs 502 and 504 across the bottom portion of the passageway openings 507 and 508, and thus the hand and arm can move easily through those passageways to grasp food on the roller tubes and to perform other operations.

FIGS. 20, 21 and 22 show another embodiment of a means 600 for mounting the cover. FIGS. 20–22 show the means 600 to include the cover 40' having a projecting tab 260' with a hole therethrough. Means 600 includes a pin 601, which can be of steel, welded to the rear side of cover 40'. Means 600 also comprises a biasing ensemble 602, shown in isolation in FIG. 20, that comprises a spring member 604 which has a boss 607. Spring 604 is shown in FIG. 20 as having an inverted "V" shape with a first leg 610 which extends into a bight 612 that extends into a second leg 615. The boss 607 extends outwardly from spring leg 615. The ensemble 602 can be made of spring steel, with the boss 607 formed from the leg 615 as by press stamping.

As seen in FIG. 22, the biasing ensemble 602 can be mounted with the cover 40'. In doing so, the cover 40' can be arranged with the housing so that the boss 607 can be inserted through the hole of tab 260' and into the lock hole 286 in each of the frame side walls 50 and 52. The spring leg 610 can then be moved to be to the side of pin 601 that is closer to the tab 260' so that the outer surface 618 of leg 610 presses against pin 600. In this position, the other leg 615 is urged in the direction towards tab 260' so that the outer surface 620 of spring leg 615 is urged against the inner surface of tab 260'. Boss 607 is thereby urged to maintain its position as shown in FIG. 22, and to remain in its corresponding hole 286 in the frame side walls 50 or 52.

FIG. 23 shows another embodiment of a tool and method for mounting a roller tube with the assembly. In FIG. 23, a tool 640 is employed. Tool 640 can be of spring steel. Tool 640 is elongated with an arcuate cross section, and is illustrated in the drawing as having a generally cylindrical shape, with a slot 642 separating its two longitudinal edges 645 and 648. Tool 640 has a first end 651, and a second end 654, both of which are of arcuate shape, and illustrated as generally being of a partially circular shape.

For purposes of illustration in FIG. 23, part of frame 46" is shown, with a bearing fitting 164' and an O-ring 166' in place. Whereas, for purposes of illustration, the tool 640 is shown to the outside of frame 46" in FIG. 23, the tool 640 can be inserted through the bearing fitting 164' and O-ring 166' from the opposite side, or interior side, of frame 46". The tool 640 can be compressed by the hand so as to pass through O-ring 166' and bearing 164', such as about ¼ to ½ inch past bearing fitting 166'. Spring 640 can then be released by the hand so that it expands outwardly to stretch O-ring 166' to press it firmly into its conforming bore section 182' (not shown). In such position the tool 640 is in a compressed state, and has a generally cylindrical shape, and its ends 651 and 654 have a generally circular shape. With the tool 640 so positioned, the roller tube 26' can be inserted from the position in which it is shown in FIG. 23, that is, from the outside of the frame 46', to pass into the tool end 651. Tube 26' can continue to be inserted through tool 640 and through bearing fitting 164' to extend about ½ inch beyond the inside of bearing fitting 164'. Tube 26' could be inserted a lesser or farther distance if desired. After insertion to such point, the tool 640 can be grasped by the operator and slid away from tube 26' and frame 46" toward the inside of the housing to thus become disengaged from tube 26" and from bearing 164' and O-ring 166'. Tube 26" is thus positioned to continue pressing the O-ring 166' outwardly into its conforming bearing bore 182'. Roller tube 26" can thence be moved through the bearing fitting 164' and O-ring 166' until it is in proximity with the other frame 48" (not shown). The process can then be repeated for inserting the tool 640 through the bearing fitting and O-ring in the other frame 48", with the tool 640 being inserted through said bearing fitting and O-ring from the outside of the other frame 98".

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A grill assembly for cooking human food comprising:
   (a) a housing, said housing comprising a support frame;
   (b) a plurality of tubular cooking members rotatably mounted with said support frame with each of the tubular members having an axis;
   (c) means for driving the tubular cooking members to rotate relative to the frame, comprising;
   (i) an electric motor having a drive shaft;
   (ii) a drive chain;
   (iii) a drive sprocket drivingly connected with the motor shaft, the drive sprocket having teeth and being positioned for engaging the drive chain so that rotation of the drive sprocket in engagement with the drive chain pulls the drive chain;
   (iv) an idler sprocket rotatably mounted to the support frame, said idler sprocket having an axis and teeth for engaging the drive chain so movement of the drive chain in engagement with the idler sprocket teeth rotates the idler sprocket, the axis of the idler sprocket being aligned with each of the axes of the tubular members; and
   (v) the tubular members having sprockets with teeth for engaging the drive chain so that movement of the drive chain in engagement with the sprocket teeth of the tubular members rotates the tubular members relative to the support frame.

2. The food grill of claim 1, further comprising the support frame having a structural reinforcement member, and the idler sprocket being rotatably mounted to the reinforcement member.

3. The food grill assembly of claim 2 wherein the structural reinforcement member has a first and a second rear extension, with an opening between the rear extensions, so that the drive chain can extend from engagement with a tubular member sprocket and pass through the opening to pass about the idler sprocket, and then extend through the opening to be engaged with the drive sprocket.

4. The food grill assembly of claim 1 further comprising a cover plate mounted to the support frame for covering the idler sprocket and covering the engagement means of the tubular members.

5. The food grill assembly of claim 1 wherein the drive chain is driven by the drive sprocket to move in a direction from the tubular members thence toward and about the idler sprocket and thence toward the drive sprocket.

6. The grill assembly of claim 1 wherein the sprockets of the tubular members have approximately the same diameter, and the diameter of the idler sprocket is approximately the same as the diameter of the tubular sprockets.

7. The grill assembly of claim 6 wherein the teeth of each of the tubular members have a circumference and the teeth of the idler sprocket have a circumference with the upper portion of the idler sprocket circumference being aligned with the upper part of the circumferences of the tubular members.

8. The grill assembly of claim 1 wherein the teeth of each of the tubular members have a circumference and the teeth of the idler sprocket have a circumference with the upper portion of the idler sprocket circumference being aligned with the upper part of the circumferences of the tubular members.

9. A grill assembly for cooking human food comprising:
(a) a housing, said housing comprising a support frame;
(b) a plurality of tubular cooking members rotatably mounted with said support frame with each of the tubular members having an axis;
(c) means for driving the tubular cooking members to rotate relative to the frame, comprising;
  (i) a drive chain;
  (ii) a drive sprocket rotatably mounted to the frame, the drive sprocket having teeth for engaging the drive chain so that rotation of the drive sprocket in engagement with the drive chain pulls the drive chain;
  (iii) an idler sprocket rotatably mourned to the support frame, said idler member having an axis and teeth for engaging the drive chain so that movement of the drive chain in engagement with the idler sprocket rotates the idler sprocket, the axis of the idler sprocket being aligned with each of the axes of the tubular members;
  (iv) the tubular members each having a sprocket with teeth for engaging the drive chain so that movement of the drive chain in engagement with the tubular members sprockets rotates the tubular members relative to the support frame, and
(d) means for powering the rotation of the drive sprocket, comprising an electric motor, so that the motor can rotate the drive sprocket with the drive sprocket pulling the chain to move in a direction from the tubular members thence toward and about the idler sprocket and thence toward the drive sprocket.

10. The grill assembly of claim 9, further comprising:
(a) the housing comprising a first support frame and a second support frame;
(b) a plurality of tubular cooking members having first and second ends rotatably mounted with the first support frame and the second support frame, respectively, the tubular cooking members having housed within them an elongated heating member; each heating member comprising an outer heat conducting sheath having first and second ends and an electrical heating element extending there through, said heating element having first and second ends, the heating element having a wound spiral configuration, with the spacing between each of the spiral winds of the heating element being more compact at the areas near the first and second ends of the heating element than in the central part of the heating element, with each of the first and second ends of the heating element being connected with first and second electrical contacts, respectively; and heat dispersing material within the sheath surrounding the heating element;
(c) first cover structure mounted with the first frame to substantially cover the first ends of the roller tubes mounted to the first frame, and second cover plate structure mounted with the second frame to substantially cover the second ends of the roller tubes mounted with the second frame, the first cover structure having openings there through sized to receive corresponding first ends of the sheathes to support the sheathes, and the second cover structure having openings sized to receive the second ends of the sheathes to support the sheathes.

11. The grill assembly of claim 10 wherein mount strips are mounted to one of the cover structures, said mount strips having openings sized to receive a sheath end, and wherein an end of the sheathes extends through a corresponding mount strip opening to be supported thereby.

12. The grill of claim 10 wherein the tubular cooking members have surfaces covered with a layer of a polymer of tetrafluoroethylene.

13. The grill assembly of claim 9 wherein the sprockets of the tubular members have approximately the same diameter, and the diameter of the idler sprocket is approximately the same as the diameter of the tubular sprockets.

14. The grill assembly of claim 13 wherein the teeth of each of the tubular members have a circumference and the teeth of the idler sprocket have a circumference with the upper portion of the idler sprocket circumference being aligned with the upper part of the circumferences of the tubular members.

15. The grill assembly of claim 9 wherein the teeth of each of the tubular members have a circumference and the teeth of the idler sprocket have a circumference with the upper portion of the idler sprocket circumference being aligned with the upper part of the circumferences of the tubular members.

16. A grill assembly for cooking human food comprising:
(a) a housing, said housing comprising first and second support frames each of which has a wall, and each of which has a first end and a second end;
(b) a plurality of tubular cooking members each of which has first and second ends, and each of which has a central axis;
(c) the support frame walls each having a plurality of holes sized to receive an end of a tubular cooking member, the holes being arranged so that holes in the wall of the first frame are horizontally aligned with a corresponding hole in the second frame, with sealing assemblies each comprising a bearing member and an annular sealing member comprising an O-ring mounted with each said hole, the sealing assemblies shaped to receive and support an end of a tubular cooking member so that the tubular member and its central axis extend horizontally from the first frame to the second frame, the wall holes being aligned so that the axes of the tubular members extend at an angle of about 3° to 5° from the first ends of the frames to the second ends of the frame.

17. The food grill of claim 16, further comprising means for driving the tubular cooking members to rotate relative to the frame, comprising:
(a) a drive chain;
(b) a drive sprocket rotatably mounted to the frame, the drive sprocket having means for engaging the drive chain so that rotation of the drive sprocket in engagement with the drive chain pulls the drive chain;
(c) an idler sprocket rotatably mounted to the support frame, said idler sprocket having means for engaging the drive chain so that movement of the drive chain in engagement with the idler sprocket rotates the idler sprocket;
(d) the idler sprocket having a central axis which central axis is in alignment with the axes of the tubular members so that the axes of the tubular members along with the axis of the idler sprocket extend at an angle of about 3° to 5° from the first ends of the frames to the second ends of the frames.

18. A grill assembly for cooking human food comprising:
(a) a housing with a side support frame, each frame having a vertically extending wall;
(b) means for heating the food, said means being mounted with the housing frames;
(c) means for controlling heating of the food;
(d) the housing having a control panel connected thereto; the control means being mounted in association with the control panel;
(e) a cover for covering the control panel and not for covering the means for heating the food, the cover having a wall; and
(f) means for pivotally mourning the cover to the housing so that the cover wall can be pivoted to a position to cover the control panel and to not cover the means for heating the food, and to a position to uncover the control panel, comprising: a pin, means for movably mounting the pin to one of the cover or a housing frame, the other of the cover or the housing frame having an opening for receiving the pin, and means for biasing the pin toward the opening, the pin being mounted to extend generally perpendicular to the walls of the housing frames, and to extend in a direction parallel with the cover wall wherein the pin has a first shaft section, the pin has a second enlarged shoulder section of larger diameter than the shaft section, and the pin has a third engagement section extending from the shoulder section in a direction away from the shaft, the biasing means comprising a spring having a first end and a second end, the spring first end abutting the pin shoulder and the spring second end abutting the cover structure about the second hole, so that the spring biases the pin shoulder in a direction toward the first hole in the cover structure.

19. The grill of claim 18 wherein the means for mounting the pin comprises structure associated with the cover providing a first hole and a second hole, the pin being sized to slide within said holes, the biasing means being positioned between the first hole and the second hole.

20. The grill of claim 18 wherein the opening for receiving the pin is an opening in the housing, and the third engagement section of the pin is biased in a direction toward the housing opening.

21. A grill assembly for cooking human foods comprising:
(a) a housing;
(b) means for heating the food, said means being mounted with the housing, the heating means comprising a plurality of tubular cooking members;
(c) means for controlling heating of the food;
(d) the housing having a control panel connected thereto, the control means being mounted in association with the control panel;
(e) a compartment assembly associated with the housing for storing of food items; means for mounting the compartment assembly to slide relative to the housing, the housing having a cavity with a first interior wall and a second interior wall, the compartment assembly having a frame comprising a first track member and a second track member, the distal ends of the first and second track members being mounted with a cover, the frame also comprising a cross strut connected to the first track and the second track so that an opening is formed between the tracks, the cross strut and the cover; a pan having walls with structure providing means for engaging the frame to be supported thereby, the pan being sized to fit between the first and second interior walls of the housing cavity and to be received within the housing cavity, the means for mounting the compartment assembly to slide relative to the housing allows the tracks to slide relative to the housing to a first position wherein the cover acts to cover the control panel, and a second position in which the cover is positioned away from the housing and the pan is positioned to expose it to permit items to be removed by hand therefrom; and
(f) the housing having a wall located beneath the tubular cooking members and above the cavity, and wherein the tubular cooking members are positioned in proximity to the wall and to the cavity so that heat from the heating means warms food items contained within the pan when the tracks are in the said first position.

22. The structure of claim 21 wherein the means for mounting the tracks to slide comprises the first interior wall having roller wheels rotatably mounted thereto, and the second interior wall having roller wheels rotatably mounted thereto, and wherein the tracks comprise channel-shaped members sized so that the first set of roller wheels can be received within the first channel to roll there along, and the second track is shaped to received the second set of roller wheels so that the second set of wheels can roll there along.

23. A grill assembly for cooking human food comprising:
(a) a housing;
(b) means for heating the food, said means being mounted with the housing;
(c) means for controlling heating of the food;
(d) the housing having a control panel connected thereto the control means being mounted in association with the control panel;
(e) a cover for covering the control panel and not for covering the means for heating the food; means for pivotally mounting the cover to the housing so that the cover can be pivoted to a position to cover the control panel and to not cover the means for heating the food, and to a position to uncover the control panel, comprising: a spring having a first leg that extends into a bight section, the bight section extending into a second leg, a boss extending from the first leg, the cover having first structure with an opening for receiving the boss, the cover also having second structure against which the second leg can be placed so that with such placement the first leg is biased toward the opening in the first structure to press the boss through the opening in the first structure, the housing having an opening for receiving the boss to allow the cover to pivot relative to the housings, the second structure comprises the cover having a rear side with a pin projecting rearwardly therefrom, the pin having a first shaft section, a second enlarged shoulder section of larger diameter than the shaft section, and a third engagement section extending from the shoulder section in a direction away from the shaft.

24. The grill assembly of claim 23 vein the boss is integral with the first leg of the spring.

25. The grill assembly of claim 24 wherein the second spring leg having an outer surface which can be placed against the pin, and wherein the second structure comprises the cover having a tab projecting rearwardly therefrom, said tab having an opening that receives the boss, the tab having an inside surface with the outside surface of the first leg being placed to press there against, so that the spring biasing action presses the first leg outer surface against the tab inner surface, and presses the second leg so that its outer surface presses against the pin.

26. The food grill assembly of claim 25 wherein the spring member is comprised of spring steel.

27. A grill assembly for cooking human food comprising:
(a) a housing, said housing comprising side support frames, each frame having a vertically extending wall;
(b) a plurality of tubular cooking members rotatably mounted with the walls of said support frames;
(c) means for driving the tubular cooking members to rotate relative to the frame, comprising;
(i) an electric motor having a drive shaft;
(ii) a drive chain;
(iii) a drive sprocket drivingly connected with the motor shaft, the drive sprocket, having teeth and being positioned for engaging the drive chain so that rotation of the drive sprocket in engagement with the drive chain pulls the drive chain;
(iv) an idler sprocket rotatably mounted to the support frame, said idler sprocket having teeth for engaging the drive chain so movement of the drive chain in engagement with the idler sprocket teeth rotates the idler sprocket; and
(v) the tubular members having sprockets with teeth for engaging the drive chain so that movement of the drive chain in engagement with the sprocket teeth of the tubular members rotates the tubular members relative to the support frame,
(d) means for heating the food, said means being mounted with the housing;
(e) means for controlling heating of the food;
(f) the housing having a control panel connected thereto; the control means being mounted in association with the control panel;
(g) a cover for covering the control panel and not for covering the means for heating the food, the cover having a wall; and
(h) means for pivotally mounting the cover to the housing so that the cover wall can be pivoted to a position to cover the control panel and to not cover the means for heating the food, and to a position to uncover the control panel, comprising: a pin, means for movably mounting the pin to one of the cover or a housing frame, the other of the cover or the housing frame having an opening for receiving the pin, and means for biasing the pin toward the opening, the pin being mounted to extend generally perpendicular to the wall of the housing frame with which the pin is mounted or received, and to extend in a direction parallel with the cover wall wherein the pin has a first shaft section, the pin has a second enlarged shoulder section of larger diameter than the shaft section, and the pin has a third engagement section extending from the shoulder section in a direction away from the shaft, the biasing means comprising a spring having a first end and a second end, the spring first end abutting the pin shoulder and the spring second end abutting the cover structure about the second hole, so that the spring biases the pin shoulder in a direction toward the first hole in the cover structure.

28. A grill assembly for cooking human food comprising:
(a) a housing, said housing comprising a support frame;
(b) a plurality of tubular cooking members rotatably mounted with said support frame with each of the tubular members having an axis;
(c) means for driving the tubular cooking members to rotate relative to the frame, comprising;
(i) an electric motor having a drive shaft;
(ii) a drive chain;
(iii) a drive sprocket drivingly connected with the motor shaft, the drive sprocket, having teeth and being positioned for engaging the drive chain so that rotation of the drive sprocket in engagement with the drive chain pulls the drive chain;
(iv) an idler sprocket rotatably mounted to the support frame, said idler sprocket having an axis and teeth for engaging the drive chain so movement of the drive chain in engagement with the idler sprocket teeth rotates the idler sprocket, the axis of the idler sprocket being aligned with each of the axes of the tubular members; and
(v) the tubular members having sprockets with teeth for engaging the drive chain so that movement of the drive chain in engagement with the sprocket teeth of the tubular members rotates the tubular members relative to the support frame;
(d) means for heating the food, said means being mounted with the housing;
(e) means for controlling heating of the food;
(f) the housing having a control panel connected thereto; the control means being mounted in association with the control panel;
(g) a cover for covering the control panel and not for covering the means for heating the food;
(h) means for pivotally mounting the cover to the housing so that the cover can be pivoted to a position to cover the control panel and to not cover the means for heating the food, and to a position to uncover the control panel, comprising: a spring having a first leg that extends into a bight section, the bight section extending into a second leg, a boss extending from the first leg, the cover having first structure with an opening for receiving the boss, the cover also having second structure against which the second leg can be placed so that with such placement the first leg is biased toward the opening in the first structure to press the boss through the opening in the first structure, the housing having an opening for receiving the boss to allow the cover to pivot relative to the housing.

29. A grill assembly for cooking human food comprising:
(a) a housing, said housing comprising a support frame;
(b) means for heating the food, comprising a plurality of tubular cooking members rotatably mounted with said support frame;

(c) means for driving the tubular cooking members to rotate relative to the frame, comprising;
(i) an electric motor having a drive shaft;
(ii) a drive chain;
(iii) a drive sprocket drivingly connected with the motor shaft, the drive sprocket, having teeth and being positioned for engaging the drive chain so that rotation of the drive sprocket in engagement with the drive chain pulls the drive chain;
(iv) an idler sprocket rotatably mounted to the support frame, said idler sprocket having an axis and teeth for engaging the drive chain so movement of the drive chain in engagement with the idler sprocket teeth rotates the idler sprocket; and
(v) the tubular members each having an axis and sprockets with teeth for engaging the drive chain so that movement of the drive chain in engagement with the sprocket teeth of the tubular members rotates the tubular members relative to the support frame and each of the axes of the tubular members being aligned with the axis of the idler sprocket;
(d) means for controlling heating of the food;
(e) the housing having a control panel connected thereto, the heating control means being mounted in association with the control panel; and
(f) a compartment assembly associated with the housing for storing of food items; means for mounting the compartment assembly to slide relative to the housing, the housing having a cavity with a first interior wall and a second interior wall, the compartment assembly having a frame comprising a first track member and a second track member, the distal ends of the first and second track members being mounted with a cover, the frame also comprising a cross strut connected to the first track and the second track so that an opening is formed between the tracks, the cross strut and the cover; a pan having walls with structure providing means for engaging the frame to be supported thereby, the pan being sized to fit between the first and second interior walls of the housing cavity and to be received within the housing cavity, the means for mounting the compartment assembly to slide relative to the housing allows the tracks to slide relative to the housing to a first position wherein the cover acts to cover the control panel, and a second position in which the cover is positioned away from the housing and the pan is positioned to expose it to permit items to be removed by hand therefrom.

30. The grill assembly Claim 29 further comprising:
(a) the housing comprising first and second support frames each of which has a wall, and each of which has a first end and a second end;
(b) a plurality of tubular cooking members each of which has first and second ends, and each of which has a central axis;
(c) the support frame walls each having a plurality of holes sized to receive an end of a tubular cooking member, the holes being arranged so that holes in the wall of the first frame are horizontally aligned with a corresponding hole in the second frame, with bearing members mounted with each said hole, the bearings shaped to receive and support an end of a tubular cooking member so that the tubular member and its central axis extend horizontally from the first frame to the second frame, the wall holes being aligned so that the axes of the tubular members extend at an angle of about 3° to 5° from the first ends of the frames to the second ends of the frame.

31. The grill assembly of claim 30 further comprising:
(a) the tubular cooking members having first and second ends rotatably mounted with the first support frame and the second support frame, respectively, the tubular cooking members having housed within them an elongated heating member; each heating member comprising an outer heat conducting sheath having first and second ends and an electrical heating element extending there through, said heating element having first and second ends, the heating element having a wound spiral configuration, with the spacing between each of the spiral winds of the heating element being more compact at the areas near the first and second ends of the heating element than in the central part of the heating element, with each of the first and second ends of the heating element being connected with first and second electrical contacts, respectively; and heat dispersing material within the sheath surrounding the heating element;
(b) first cover structure mounted with the first frame to substantially cover the first ends of the roller tubes mounted to the first frame, and second cover plate structure mounted with the second frame to substantially cover the second ends of the roller tubes mounted with the second frame, the first cover structure having openings there through sized to receive corresponding first ends of the sheathes to support the sheathes, and the second cover structure having openings sized to receive the second ends of the sheathes to support the sheathes.

32. The grill assembly of claim 29 further comprising a guard for covering food located with a housing, the guard comprising:
(a) first and second legs, the legs having side walls, the leg side walls extending upwardly into a top section, each side wall having a bottom, each side wall having a first end, and the side walls having an opening at the first end of the side walls that extends between and from the bottoms of the side walls to the top section so that the side walls are separated from one another by said opening, the opening extending into a passageway located between the sidewalls;
(b) a flap, means for mounting the flap with the guard to be movable relative to the side walls so that the flap can be moved to a first position wherein the flap covers the opening, and moved to a second position away from the first ends of the side walls to expose the opening to allow a hand to be extended through the opening into the passageway to grasp food located on the housing.

33. A grill assembly for cooking human foods comprising:
(a) a housing;
(b) means for heating the food, said means being mounted with the housing, the heating means comprising a plurality of tubular cooking members, said cooking members having cylindrical outer surfaces;
(c) means for controlling heating of the food;
(d) the housing having a control panel connected thereto, the control means being mounted in association with the control panel;
(e) a sealing assembly comprising a bearing member, and an annular sealing member comprising an O-ring, the bearing member having a bore there through for receiving the tubular member there through, the bearing member bore having a section which has an annular recessed shape for receiving the annular sealing member, so that the bearing member and annular member can be placed about the tubular member with the annular sealing member held against the outer surface of the tubular member; and (f) a compartment assembly associated with the housing for storing of food items; means for mounting the compartment assembly to slide relative to the housing, the housing having a cavity with a first interior wall and a second interior wall, the compartment assembly having a frame comprising a first track member and a second track member, the distal ends of the first and second track members being mounted with a cover, the frame also comprising a cross strut connected to the first track and the second track so that an opening is formed between the tracks, the cross strut and the cover; a pan having walls with structure providing means for engaging the frame to be supported thereby, the pan being sized to fit between the first and second interior walls of the housing cavity and to be received within the housing cavity, the means for mounting the compartment assembly to slide relative to the housing allows the tracks to slide relative to the housing to a first position wherein the cover acts to cover the control panel, and a second position in which the cover is positioned away from the housing and the pan is positioned to expose it to permit items to be removed by hand therefrom.

34. The grill assembly of claim 33 further comprising:
(a) the housing comprising first and second support frames each of which has a wall, and each of which has a first end and a second end;
(b) a plurality of tubular cooking members each of which has first and second ends, and each of which has a central axis;
(c) the support frame walls each having a plurality of holes sized to receive an end of a tubular cooking member, the holes being arranged so that holes in the wall of the first frame are horizontally aligned with a corresponding hole in the second frame, with bearing members mounted with each said hole, the bearings shaped to receive and support an end of a tubular cooking member so that the tubular member and its central axis extend horizontally from the first frame to the second frame, the wall holes being aligned so that the axes of the tubular members extend at an angle of about 3° to 5° from the first ends of the frames to the second ends of the frame.

35. The grill assembly of claim 24 further comprising:
(a) the tubular cooking members having first and second ends rotatably mounted with the first support frame and the second support frame, respectively, the tubular cooking members having housed within them an elongated heating member; each heating member comprising an outer heat conducting sheath having first and second ends and an electrical heating element extending there through, said heating element having first and second ends, the heating element having a wound spiral configuration, with the spacing between each of the spiral winds of the heating element being more compact at the areas near the first and second ends of the heating element than in the central part of the heating element, with each of the first and second ends of the heating element being connected with first and second electrical contacts, respectively; and heat dispersing material within the sheath surrounding the heating element;

(b) first cover structure mounted with the first frame to substantially cover the first ends of the roller tubes mounted to the first frame, and second cover plate structure mounted with the second frame to substantially cover the second ends of the roller tubes mounted with the second frame, the first cover structure having openings there through sized to receive corresponding first ends of the sheathes to support the sheathes, and the second cover structure having openings sized to receive the second ends of the sheathes to support the sheathes.

36. The grill assembly of claim 33, further comprising a guard for covering food located with a housing, the guard comprising:
(a) first and second legs, the legs having side walls, the leg side walls extending upwardly into a top section, each side wall having a bottom, each side wall having a first end, and the side walls having an opening at the first end of the side walls that extends between and from the bottoms of the side walls to the top section so that the side walls are separated from one another by said opening, the opening extending into a passageway located between the sidewalls; and
(b) a flap, means for mounting the flap with the guard to be movable relative to the side walls so that the flap can be moved to a first position wherein the flap covers the opening, and moved to a second position away from the first ends of the side walls to expose the opening to allow a hand to be extended through the opening into the passageway to grasp food located on the housing.

37. A grill assembly for cooking human food comprising:
(a) a housing;
(b) means for heating the food, said means being mounted with the housing, said means comprising a plurality of tubular cooking member rotatably mounted to the housing, said cooking members having cylindrical outer surfaces;
(c) means for controlling heating of the food;
(d) a sealing assembly comprising a bearing member, and an annular sealing member comprising an O-ring, the bearing member having a bore there through for receiving the tubular member there through, the bearing member bore having a section which has an annular recessed shape for receiving the annular sealing member, so that the bearing member and annular member can be placed about the tubular member with the annular sealing member held against the outer surface of the tubular member;
(e) the housing having a control panel connected thereto; the control means being mounted in association with the control panel;
(f) a cover for covering the control panel and not for covering the means for heating the food; and
(g) means for pivotally mounting the cover to the housing so that the cover can be pivoted to a position to cover the control panel and to not cover the means for heating the food, and to a position to uncover the control panel.

38. The grill assembly of claim 37 wherein the pivot means comprises a pin, means for movably mounting the pin to one of the cover or the housing, the other of the cover or the housing having an opening for receiving the pin, and means for biasing the pin toward the opening.

39. The sealing assembly of claim 37 wherein the pivot means comprises a spring having a first leg that extends into a bight section, the bight section extending into a second leg, a boss extending from the first leg, the cover having first structure with an opening for receiving the boss, the cover also having second structure against which the second leg can be placed so that with such placement the first leg is biased toward the opening in the first structure to press the boss through the opening in the first structure, the housing having an opening for receiving the boss to allow the cover to pivot relative to the housing.

40. The grill assembly of claim 37, further comprising:
(a) the housing comprising first and second support frames each of which has a wall, and each of which has a first end and a second end;
(b) a plurality of tubular cooking members each of which has first and second ends, and each of which has a central axis;
(c) the support frame walls each having a plurality of holes sized to receive an end of a tubular cooking member, the holes being arranged so that holes in the wall of the first frame are horizontally aligned with a corresponding hole in the second frame, with bearing members mounted with each said hole, the bearings shaped to receive and support an end of a tubular cooking member so that the tubular member and its central axis extend horizontally from the first frame to the second frame, the wall holes being aligned so that the axes of the tubular members extend at an angle of about 3° to 5° from the first ends of the frames to the second ends of the frame.

41. The grill assembly of claim 40 further comprising:
(a) the tubular cooking members having first and second ends rotatably mounted with the first support frame and the second support frame, respectively, the tubular cooking members having housed within them an elongated heating member; each heating member comprising an outer heat conducting sheath having first and second ends and an electrical heating element extending there through, said heating element having first and second ends, the heating element having a wound spiral configuration, with the spacing between each of the spiral winds of the heating element being more compact at the areas near the first and second ends of the heating element than in the central part of the heating element, with each of the first and second ends of the heating element being connected with first and second electrical contacts, respectively; and heat dispersing material within the sheath surrounding the heating element;
(b) first cover structure mounted with the first frame to substantially cover the first ends of the roller tubes mounted to the first frame, and second cover plate structure mounted with the second frame to substantially cover the second ends of the roller tubes mounted with the second frame, the first cover structure having openings there through sized to receive corresponding first ends of the sheathes to support the sheathes, and the second cover structure having openings sized to receive the second ends of the sheathes to support the sheathes.

42. The grill assembly of claim 37, further comprising a guard for covering food located with a housing, the guard comprising:
(a) first and second legs, the legs having side walls, the leg side walls extending upwardly into a top section, each side wall having a bottom, each side wall having a first end, and the side walls having an opening at the first end of the side walls that extends between and from the bottoms of the side walls to the top section so that the side walls are separated from one another by said opening, the opening extending into a passageway located between the sidewalls; and
(b) a flap, means for mounting the flap with the guard to be movable relative to the side walls so that the flap can be moved to a first position wherein the flap covers the opening, and moved to a second position away from the first ends of the side walls to expose the opening to allow a hand to be extended through the opening into the passageway to grasp food located on the housing.

43. A grill assembly for cooking human food comprising:
(a) a housing, said housing comprising a support frame;
(b) a plurality of tubular cooking members rotatably mounted with said support frame, with each of the tubular members having an axis;
(c) an electric motor having a drive shaft;
(d) a drive chain;
(e) a drive sprocket drivingly connected with the motor shaft, the drive sprocket having teeth and being positioned for engaging the drive chain so that rotation of the drive sprocket in engagement with the drive chain pulls the drive chain;
(f) an idler sprocket rotatably mounted to the support frame, said idler sprocket having an axis and having teeth for engaging the drive chain so that movement of the drive chain in engagement with the idler sprocket teeth rotates the idler sprocket, the axis of the idler sprocket being aligned with each of the axes of the tubular members; and
(g) the tubular members having sprockets with teeth for engaging the drive chain so that movement of the drive chain in engagement with the sprocket teeth of the tubular members rotates the tubular members relative to the support frame.

44. The grill assembly of claim 43 wherein the sprockets of the tubular members have approximately the same diameter, and the diameter of the idler sprocket is approximately the same as the diameter of the tubular sprockets.

45. The grill assembly of claim 44 wherein the teeth of each of the tubular members have a circumference and the teeth of the idler sprocket have a circumference with the upper portion of the idler sprocket circumference being aligned with the upper part of the circumferences of the tubular members.

46. The grill assembly of claim 43 wherein the teeth of each of the tubular members have a circumference and the teeth of the idler sprocket have a circumference with the upper portion of the idler sprocket circumference being aligned with the upper part of the circumferences of the tubular members.

47. A grill assembly for cooking human food comprising:
(a) a housing, said housing comprising a support frame;
(b) a plurality of tubular cooking members rotatably mounted with said support frame with each of the tubular members having an axis;
(c) a drive chain;
(d) a drive sprocket rotatably mounted to the frame, the drive sprocket having teeth for engaging the drive chain so that rotation of the drive sprocket in engagement with the drive chain pulls the drive;
(e) an idler sprocket rotatably mounted to the support frame, said idler sprocket having an axis and having teeth for engaging the drive chain so that movement of the drive chain in engagement with the idler sprocket rotates the idler sprocket, the axis of the idler sprocket being aligned with each of the axes of the tubular members;

(f) the tubular members each having a sprocket with teeth for engaging the drive chain so that movement of the drive chain in engagement with the tubular members sprockets rotates the tubular members relative to the support frame; and (g) an electric motor, the motor having a drive shaft drivingly connected to the drive sprocket so that the motor can rotate the drive shaft and the drive sprocket with the drive sprocket pulling the chain to move in a direction from the tubular members thence toward and about the idler sprocket and thence toward the drive sprocket.

48. A grill assembly for cooking human food comprising:

(a) a housing, said housing comprising a support frame;

(b) a plurality of tubular cooking members rotatably mounted with said support frame;

(c) an electric motor having a drive shaft;

(d) a drive chain;

(e) a drive sprocket drivingly connected with the motor shaft, the drive sprocket having teeth and being positioned for engaging the drive chain so that rotation of the drive sprocket in engagement with the drive chain pulls the drive chain;

(f) an idler sprocket rotatably mounted to the support frame, said idler sprocket having teeth for engaging the drive chain so that movement of the drive chain in engagement with the idler sprocket teeth rotates the idler sprocket, the idler sprocket having a circumference with an upper portion; and (g) the tubular members having sprockets with teeth for engaging the drive chain so that movement of the drive chain in engagement with the sprocket teeth of the tubular members rotates the tubular members relative to the support frame, each of the sprockets having a circumference with an upper portion with the upper portion of the idler sprocket being aligned with the upper portions of the sprockets of the tubular members.

49. The grill assembly of claim 48 wherein the circumference of the idler sprocket is approximately equal to the circumferences of the sprockets of the tubular members.

* * * * *

UNITED STATES PATENT AND TRADEMARK OFFICE
CERTIFICATE OF CORRECTION

| | | |
|---|---|---|
| PATENT NO. | : 6,782,802 B2 | |
| APPLICATION NO. | : 10/080211 | |
| DATED | : August 31, 2004 | |
| INVENTOR(S) | : Thomas Hunot, Michael Lee Huegerich and Frank J. Ricchio | |

It is certified that error appears in the above-identified patent and that said Letters Patent is hereby corrected as shown below:

Title Page, Col. 1, Line 6
 Replace "Frank P. Ricchio"
 With --Frank J. Ricchio--

Title Page, Col. 1, line 9
 Replace "Star Manufacturing International"
 with --Star Manufacturing International Inc.--

Title Page, Col. 2, Line 17
 Replace "Brochre"
 With --Brochure--

Col. 14, Line 26
 Replace "F."
 with --F--

Col. 14, Line 29
 Replace "F."
 with --F--

Col. 15, Line 65
 Replace "166'"
 with --164'--

Col. 17, Line 41
 Replace "mourned'
 with --mounted--

Col. 20, Line 48
 Replace "thereto"
 with --thereto;--

Col. 21, Line 1
 Replace "housings"
 with --housing--

Col. 21, Line 8
 Replace "vein"
 with --wherein--

UNITED STATES PATENT AND TRADEMARK OFFICE
CERTIFICATE OF CORRECTION

PATENT NO. : 6,782,802 B2
APPLICATION NO. : 10/080211
DATED : August 31, 2004
INVENTOR(S) : Thomas Hunot, Michael Lee Huegerich and Frank J. Ricchio It is certified that error appears in the above-identified patent and that said Letters Patent is hereby corrected as shown below:

Col. 25, Line 50
 Replace "24"
 with --34--

Col. 26, Line 35
 Replace "member"
 with --members--

Col. 26, Line 63
 Replace "sealing"
 with --grill--

Col. 28, Line 60
 Replace "drive;"
 with --drive chain;--

Signed and Sealed this

Twenty-first Day of August, 2007

JON W. DUDAS
*Director of the United States Patent and Trademark Office*